(12) United States Patent
Ishii

(10) Patent No.: US 7,460,085 B2
(45) Date of Patent: Dec. 2, 2008

(54) DISPLAY DEVICE, METHOD OF CONTROLLING DISPLAY DEVICE, CONTROL PROGRAM, AND RECORDING MEDIUM

(75) Inventor: Junichiro Ishii, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 608 days.

(21) Appl. No.: 11/044,036

(22) Filed: Jan. 28, 2005

(65) Prior Publication Data

US 2005/0174302 A1   Aug. 11, 2005

(30) Foreign Application Priority Data

| Jan. 30, 2004 | (JP) | ............................. 2004-023202 |
| Feb. 4, 2004 | (JP) | ............................. 2004-027824 |
| Feb. 4, 2004 | (JP) | ............................. 2004-027825 |
| Oct. 25, 2004 | (JP) | ............................. 2004-309319 |

(51) Int. Cl.
  *G09G 5/00*  (2006.01)
(52) U.S. Cl. .......................... 345/1.1; 345/2.1; 345/2.2; 345/2.3

(58) Field of Classification Search .................. 345/1.1, 345/2.1–2.3
See application file for complete search history.

(56) References Cited

U.S. PATENT DOCUMENTS

| 6,216,490 B1 | 4/2001 | Radley-Smith |
| 6,571,577 B2 | 6/2003 | Radley-Smith |
| 7,152,989 B2 * | 12/2006 | Radley-Smith ............. 362/104 |

FOREIGN PATENT DOCUMENTS

| GB | 2297021 A | 7/1996 |
| JP | 6102378 A | 4/2004 |

* cited by examiner

*Primary Examiner*—Richard Hjerpe
*Assistant Examiner*—Leonid Shapiro
(74) *Attorney, Agent, or Firm*—Global IP Counselors, LLP

(57) ABSTRACT

Disclosed is a display device characterized by comprising a frame having a ring shape and mounted on a user and a display unit arranged along the frame over substantially its entire circumference. The display device comprises a controller having judgment means for judging which position is the position where the display unit is arranged in relation to another display unit on the basis of a signal from a receiver, storage means for storing positional information in the judgment means, and display control means for controlling the display of the display unit on the basis of the positional information stored in the storage means. Further, disclosed is a display system comprising the display device and a communication unit for communicating with the display device.

8 Claims, 21 Drawing Sheets

DISPLAY DEVICE, METHOD OF CONTROLLING DISPLAY DEVICE, CONTROL PROGRAM, AND RECORDING MEDIUM

TECHNICAL FIELD

The present invention relates to a display device, a method of controlling the display device, a control program, and a recording medium, and more particularly, to a ring-shaped display device mounted on an arm or the like, a method of controlling the display device, a control program, and a recording medium.

BACKGROUND ART

Display devices conventionally mounted on arms are wristwatch types or bracelet types (Japanese Unexamined Patent Application No. 2000-209319 and Japanese Utility Model Application No. 30965593, for example).

DISCLOSURE OF INVENTION

[Problems to be Solved by the Invention]

In the wristwatch-type display device or the bracelet type display device, the area of a display screen on which display is actually performed is narrower than the size of the overall display device, so that the amount of information to be displayed cannot be made too large from the viewpoint of visibility or the like.

The shape of a display unit is a planar shape in which reading of character information or the like is mainly performed, so that its display form has a limitation.

Therefore, an object of the present invention is to provide a small and portable display device capable of increasing the amount of information to be displayed and capable of coping with various display forms, a method of controlling the display device, a control program, and a recording medium.

[Solution to the Problems]

In order to solve the above-mentioned problem, a display device is including a frame having a ring shape or brought into a ring shape at the time of at least mounting and a display unit having a display screen arranged along a peripheral surface of the frame over substantially its entire circumference.

In the display device, it is desirable that a plurality of display units are arranged along the peripheral surface of the frame.

In either of the display devices, a power supply and a driving circuit for driving the display unit may be arranged between the frame and the display unit.

The power supply may be constructed as an accumulator device for storing power upon receipt of supply of the power from the outside.

Furthermore, the power supply and the driving circuit may be arranged at different peripheral surface positions of the frame.

Furthermore, either of the display devices may have a display data receiver for receiving display data from external equipment, a storage for storing the received display data, and a display controller for reading out the display data from the storage and displaying on the display unit an image corresponding to the display data.

The display data receiver may receive the display data by short-distance radio communication.

In order to solve the above-mentioned problem, a control method for controlling a display device including a frame having a ring shape or brought into a ring shape at the time of at least mounting and one or a plurality of display units arranged along a peripheral surface of the frame and having a display screen arranged along the peripheral surface of the frame over substantially its entire circumference is including a display data receiving step for receiving display data from external equipment, a storing step for storing the received display data, and a display controlling step for reading out the stored display data and displaying an image corresponding to the display data on the display unit.

In the control method, the display data may be received by short-distance radio communication in the display data receiving step.

In order to solve the above-mentioned problem, a control program for causing a computer to control a display device including a frame having a ring shape or brought into a ring shape at the time of at least mounting and one or a plurality of display units arranged along a peripheral surface of the frame and having a display screen arranged along the peripheral surface of the frame over substantially its entire circumference is characterized by receiving display data from external equipment, storing the received display data, and reading out the stored display data and displaying an image corresponding to the display data on the display unit.

Each of the control programs may be recorded on a computer readable recording medium.

In order to solve the above-mentioned problem, the above-mentioned display device may have a receiver and a transmitter for performing directional communication between the display device and another display device which should display an image in incorporation with each other and are arranged adjacent to each other, a rotational position detector for detecting a self-rotational position relative to a predetermined reference position in a case where the display devices are mounted substantially adjacent to each other such that their respective display screens are arranged along a peripheral surface in the shape of a substantial cylinder by the communication, and a display controller for displaying an image corresponding to the display data on the display unit using the predetermined reference position as a display reference position on the basis of the relative rotational position.

In the above-mentioned configuration, the receiver and the transmitter permit communication between the display device and the other display device which should display an image in cooperation with each other. The rotational position detector detects the self-rotational position relative to the predetermined reference position in a case where the display devices are mounted substantially adjacent to each other such that the respective display screens are arranged along the peripheral surface in the shape of a substantial cylinder by the communication. From the results, the display controller causes the display unit to display the image corresponding to the display data using the predetermined reference position as the display reference position on the basis of the relative rotational position.

The above-mentioned display device may have a self-position storage for storing self-position specification information for specifying, out of the plurality of display devices which should display an image in cooperation with one another, a self-position in a direction along an axis of rotation of the substantial cylinder. The display controller may cause the display unit to display a partial image composing the above-mentioned image which should be displayed on the basis of the self-position specification information.

The receiver may have a position information receiver for receiving the self-position specification information from the display device positioned on one side along the axis of rotation and storing the received self-position specification information in the self-position storage, and a position information transmitter for transmitting the subsequent position specification information, i.e., self-position specification information corresponding to the display device, which will be positioned on the other side along the axis of rotation. The display device may have a subsequent position information generator for generating the subsequent position specification information on the basis of the self-position specification information.

Furthermore, the transmitter may transmit, when it does not receive terminal end information from the display device which will be positioned on the other side, the terminal end information to the one side, assuming that the transmitter itself is the display device positioned at the other end.

Furthermore, the transmitter may transmit its own self-position specification information together with the terminal end information.

The self-position storage may store in its initial state central position specification information indicating that the display device is arranged at a substantially central position out of the plurality of display devices as the self-position specification information.

Furthermore, the self-position storage may have a reference position specification unit for specifying as the display reference position a position which is either one of peripheral surface directions of the display screen of the display device when it stores the central position specification information.

The transmitter may transfer the terminal end information toward the one side when the self-position storage does not store the central position specification information and the transmitter receives the terminal end information from the display device positioned on the other side.

The transmitter may transfer self-position specification information corresponding to the display device positioned at the other end together with the terminal end information.

In order to solve the above-mentioned problem, a method of controlling a display device including a frame having a ring shape or brought into a ring shape at the time of at least mounting and a display unit having a display screen arranged along a peripheral surface of the frame over substantially its entire circumference is including a communicating step for performing directional communication between the display device and another display device which should display an image in cooperation with each other and are adjacent to each other, a rotational position detecting step for detecting a self-rotational position relative to a predetermined reference position in a case where both the display devices are mounted substantially adjacent to each other such that their respective display screens are arranged along a peripheral surface in the shape of a substantial cylinder, and a display controlling step for causing the display unit to display an image corresponding to the display data using the predetermined reference position as a display reference position on the basis of the relative rotational position.

The control method may have a self-position storing step for storing self-position specification information for specifying, out of the plurality of display devices which should display an image in cooperation with one another, a self-position in a direction along an axis of rotation of the substantial cylinder. In the display controlling step, the display unit may be caused to display a partial image composing the above-mentioned image which should be displayed on the basis of the self-position specification information.

The communicating step may have a position information receiving step for receiving the self-position specification information from the display device positioned on one side along the axis of rotation and storing the received self-position specification information in the self-position storage, and a position information transmitting step for transmitting the subsequent position specification information, i.e., self-position specification information corresponding to the display device, which will be positioned on the other side along the axis of rotation. The control method may further have a subsequent position information generating step for generating the subsequent position specification information on the basis of the self-position specification information.

In order to solve the above-mentioned problem, a computer control program for causing a computer to control a display device including a frame having a ring shape or brought into a ring shape at the time of at least mounting, a display unit having a display screen arranged along a peripheral surface of the frame over substantially its entire circumference, and a receiver and a transmitter for performing directional communication between the display device and another display device which should display an image in cooperation with each other and are arranged adjacent to each other is characterized by detecting a self-rotational position relative to a predetermined reference position in a case where the display devices are mounted substantially adjacent to each other such that their respective display screens are arranged along a peripheral surface in the shape of a substantial cylinder by the communication, and displaying an image corresponding to the display data on the display unit using the predetermined reference position as a display reference position on the basis of the relative rotational position.

The control program may store self-position specification information for specifying, out of the plurality of display devices which should display an image in cooperation with one another, a self-position in a direction along an axis of rotation of the substantial cylinder and cause the display unit to display a partial image composing the above-mentioned image which should be displayed on the basis of the self-position specification information.

The control program may receive the self-position specification information from the display device positioned on one side along the axis of rotation, store the self-position specification information, transmit the subsequent position specification information, i.e., self-position specification information corresponding to the display device, which will be positioned on the other side along the axis of rotation, and generate the subsequent position specification information on the basis of the self-position specification information.

Each of the control programs may be recorded on a computer readable recording medium.

In order to solve the above-mentioned problem, the above-mentioned display device is including a receiver and a transmitter for performing communication between the display device and the other display device and synchronizing the display devices with each other to display an image, and a display controller for causing the display unit to display on the basis of display data an image corresponding to the display data in a state where the display device is synchronized with the other display device.

According to the display device, the receiver and the transmitter permit communication between the display device and the other display device, and synchronize the display devices with each other to display an image. Thus, the display controller causes the display unit to display on the basis of display data an image corresponding to the display data in a state where the display device is synchronized with the other display device.

In the display device, the display unit may have a plurality of sub-display units.

The display device may have a storage for storing the display data. The communication unit may receive display data from external equipment and store the received display data in the storage, and the display controller may read out the display data from the storage and cause the display unit to display an image corresponding to the read display data.

Furthermore, the receiver and the transmitter, together with the one or plurality of display devices, may constitute a communication network, to achieve the synchronization through the communication network.

Furthermore, the communication network may be constructed as a communication network of a peer-to-peer type, a start type, a ring type, or a bus-type.

The receiver and the transmitter may establish short-distance radio communication.

In order to solve the above-mentioned problem, a method of controlling a display device including a frame having a ring shape or brought into a ring shape at the time of at least mounting and one or a plurality of display units arranged along a peripheral surface of the frame and having a display screen arranged along the peripheral surface of the frame over substantially its entire circumference is including a communicating step for performing communication between the display device and the other display device and synchronizing the display devices to display an image, and a display controlling step for causing the display unit to display on the basis of display data an image corresponding to the display data in a state where the display device is synchronized with the other display device.

In the control method, the communicating step may have a storing step for receiving display data from external equipment and storing the received display data. In the display controlling step, the stored display data is read out, and the display unit may be caused to display an image corresponding to the read display data.

In the communicating step, communication may be established by short-distance radio communication.

In order to solve the above-mentioned problem, a control program for causing a computer to control a display device including a frame having a ring shape or brought into a ring shape at the time of at least mounting and one or a plurality of display units arranged along a peripheral surface of the frame and having a display screen arranged along the peripheral surface of the frame over substantially its entire circumference is characterized by performing communication between the display device and the other display device and synchronizing the display devices with each other to display an image, and causing the display unit to display on the basis of display data an image corresponding to the display data in a state where the display device is synchronized with the other display device.

The control program may be one for receiving display data from external equipment, storing the received display data, reading out the stored display data, and causing the display unit to display an image corresponding to the display data.

Each of the control programs may be recorded on a computer readable recording medium.

BEST MODE FOR CARRYING OUT THE INVENTION

Figure 1:
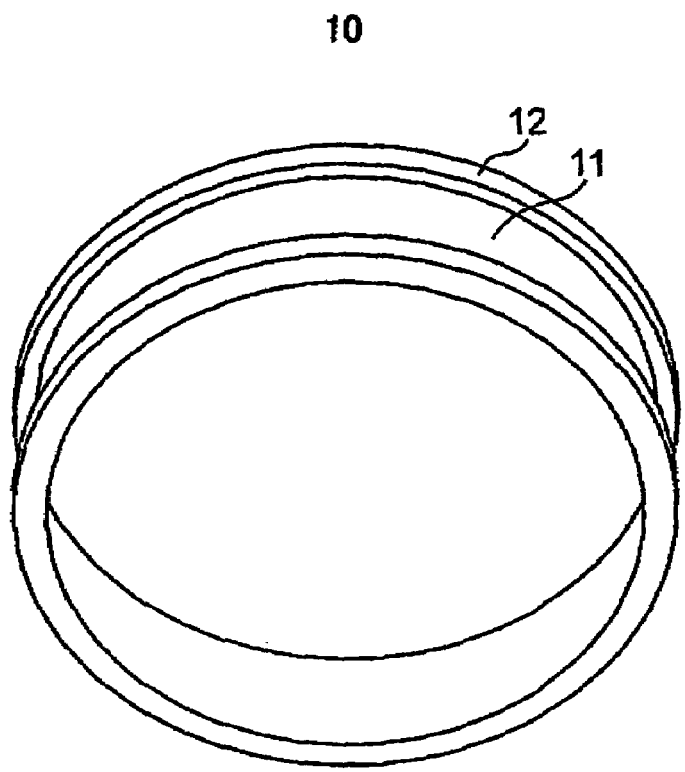
FIG. 1 is a perspective view showing the appearance of a display device according to a first embodiment.

Embodiments of the present invention will be described with reference to the drawings. It is clearly understood by those skilled in the art from the disclosure of the present invention that description relating to the embodiments of the present invention is for only describing the present invention and is not for limiting the present invention defined by the scope of the claims, described later, and its equivalent range.

Referring to the drawings, suitable embodiments of the present invention will be described in detail.

[1] First Embodiment

Figure 2:
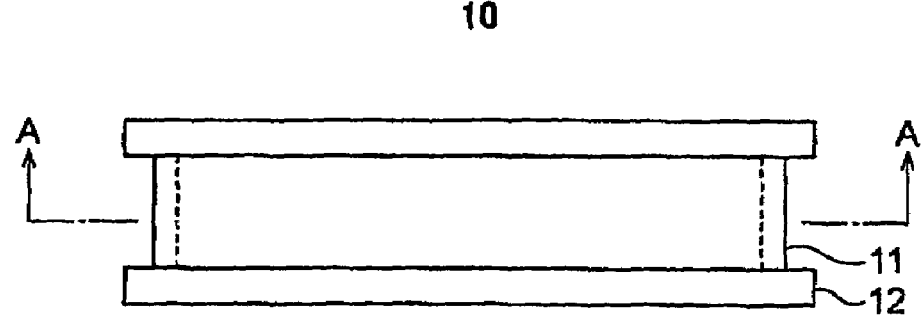
FIG. 2 is a side view showing the appearance of the display device according to the first embodiment.

FIG. 1 is a perspective view showing the appearance of a display device 10 according to an embodiment. FIG. 2 is a side view showing the appearance of the display device 10.

The display device 10 has a display unit 11 for displaying various types of information and a frame 12 if it is roughly divided. The frame 12 has a groove, is mounted on the arm of a user, and supports the display unit 11. The inner diameter of the frame 12 is preferably 50 to 70 mmϕ and the width thereof is preferably 5 mm to 30 mm in consideration of mounting properties in a case where a bracelet is assumed. The shape of the frame 12 is not only a circular shape but also an elliptical shape or a polygonal shape. A portion, outside the display unit 11, of the frame 12 is projected so as to protect a display surface of the display unit 11, as shown in FIGS. 1 and 2.

Figure 3:
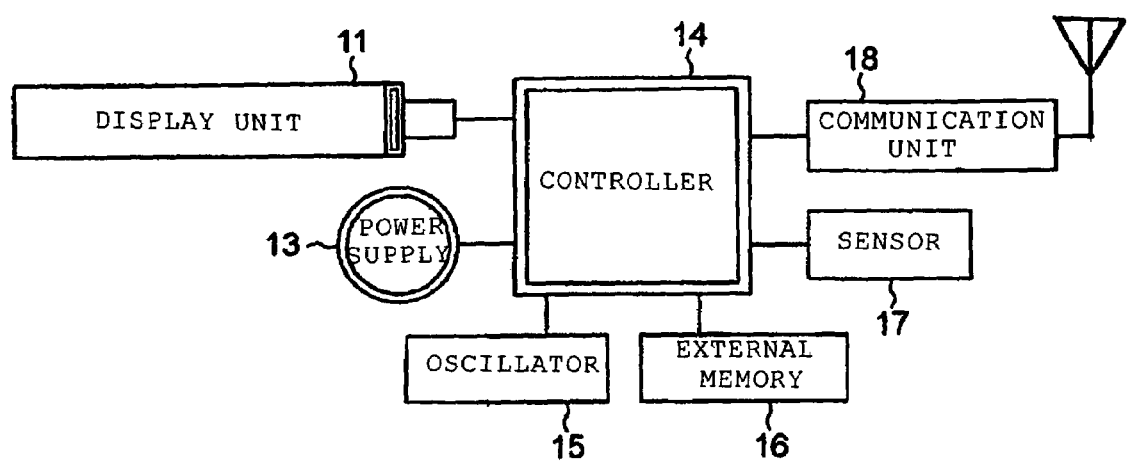
FIG. 3 is a block diagram showing the schematic configuration of the display device according to the first embodiment.

FIG. 3 is a block diagram showing the schematic configuration of the display device 10.

The display device 10 has the above-mentioned display unit 11, a power supply 13 for supplying power to each unit, a controller 14 for controlling the whole of the display device 10, an oscillator 15 for generating a reference oscillation signal and outputting the generated reference oscillation signal, an external memory 16 for storing various types of information, a sensor 17 for inputting information, and a communication unit 18 for receiving display data from the outside if it is roughly divided.

Figure 4:
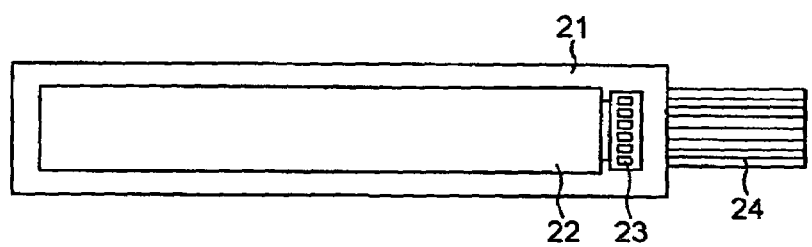
FIG. 4 is a plan view of a display unit before assembling in the first embodiment.

FIG. 4 is a plan view of the display unit 11 before assembling.

The display unit 11 has a flexible substrate 21 formed of a flexible member such as resin (plastic: using polyimide, polyester, etc.). On the flexible substrate 21, a display panel 22 such as a (reflection type) liquid crystal display panel, an organic EL (electroluminescence) display panel, or an electrophoretic display panel, and a driver circuit 23 for driving the display panel 22. A connector 24 to be electrically connected to the controller 14 is provided at one end of the flexible substrate 21. The driver circuit 23 is composed of an LTPS-TFT (Low Temperature Poly Silicon-Thin Film Transistor) which is an extreme cold process provided on the flexible substrate 21 made of resin, for example, or is composed of a surface mounting component.

The power supply 13 must be arranged along a peripheral surface of the frame 12, is preferably one which is flexible and whose shape can be changed, and is composed of a lithium polymer battery which is a secondary battery, for example. However, the power supply 13 may not be composed of a flexible material, provided that it can have a shape along the peripheral surface of the frame 12. Although as a charging system to the power supply 13, power can be supplied to the power supply 13 by providing a charging terminal in the frame 12 and applying a charging voltage to the charging terminal, as is generally performed, the power can be also supplied to the power supply 13 by radio using a system such as electromagnetic induction. A primary battery such as a normal button battery can be also used if the battery can be replaced from a reverse surface (from an inner peripheral surface) of the frame 12.

The controller 14 is constructed as a so-called microcomputer, and has an MPU (Microprocessor Unit), a ROM, a RAM, etc. (not shown). The MPU performs processing on the basis of a control program previously stored in the ROM to control the whole of the display device 10. The RAM temporarily stores various types of data. The oscillator 15 contains a crystal oscillator, and generates reference oscillation signals to be used as various types of reference clocks by the controller 14 and outputs the generated reference oscillation signals to the controller 14. The external memory 16 mainly stores display data, a part or the whole of which is taken as a nonvolatile memory as required. The sensor 17 functions as a so-called operation unit, has an acceleration sensor, a gyro sensor, etc., for example, and detects an arm swinging state of a user, for example, to perform various types of operations such as selection of a display image and start/stop of display. The communication unit 18 performs short-distance radio communication, to receive display data from external equipment such as a communication unit 5 (see FIG. 7), a dedicated image transfer device, or an image management system and transfer the received display data to the external memory 16 under control of the controller 14.

Figure 5:
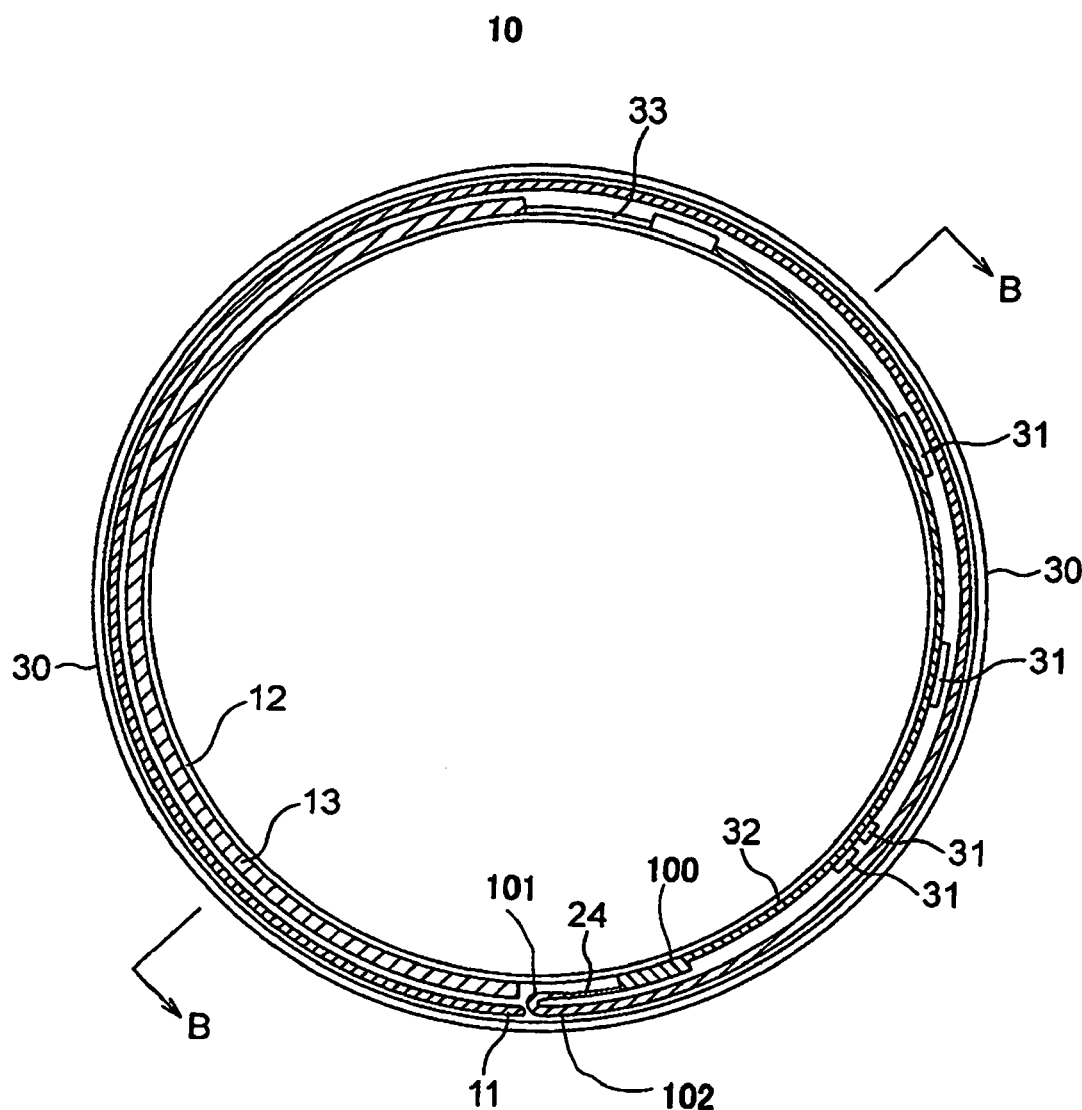
FIG. 5 is an end view taken along a line A-A of the display device shown in FIG. 2.
Figure 6:
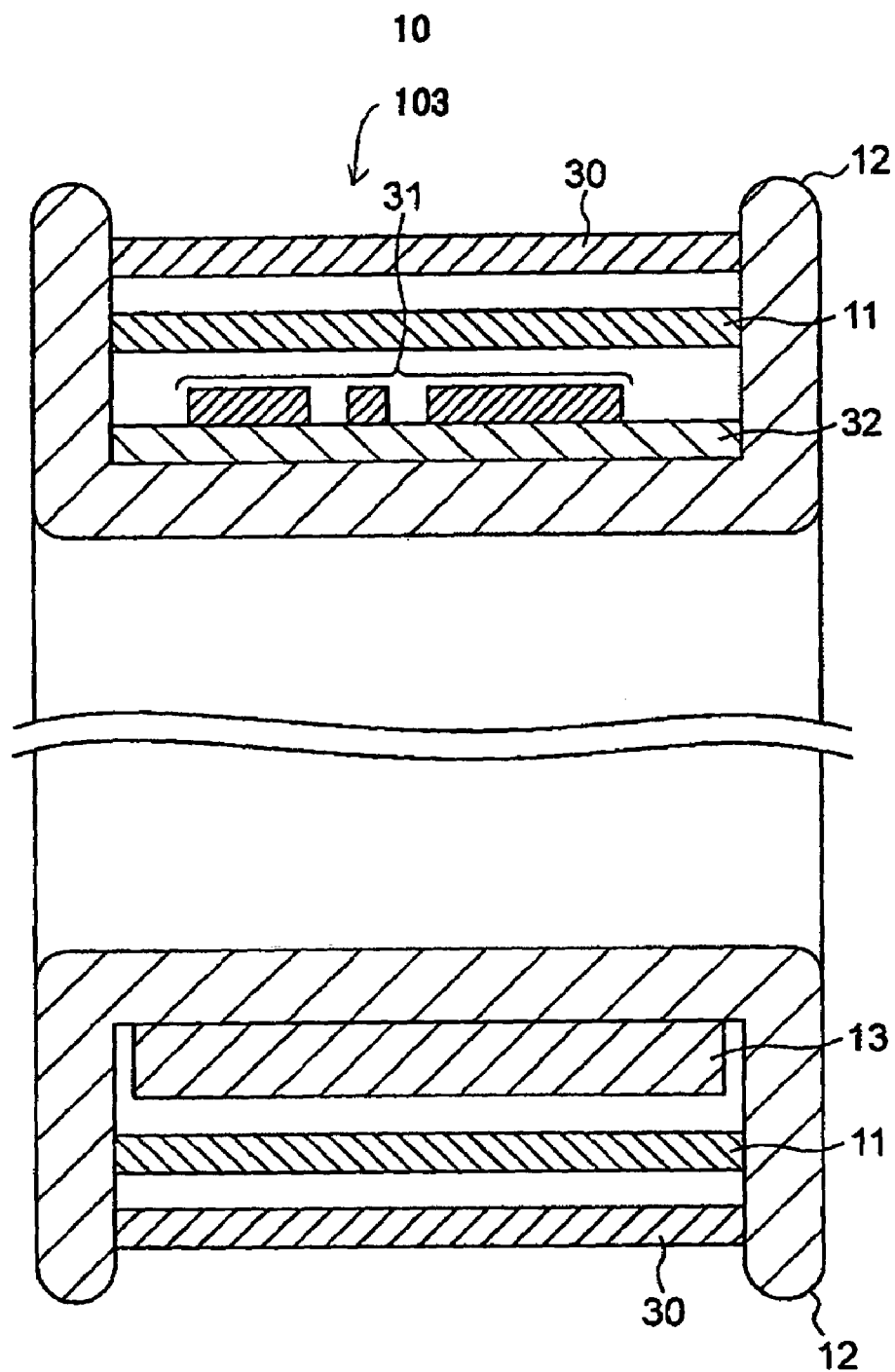
FIG. 6 is a cross-sectional view taken along a line B-B of the display device shown in FIG. 5.

FIG. 5 is an end view taken along a line A-A of the display device 10 shown in FIG. 2. FIG. 6 is a cross-sectional view taken along a line B-B of the display device shown in FIG. 5. In FIG. 6, the illustration of a supporting member for supporting each member is omitted.

In a portion on the left side of FIG. 5, a power supply 13, a display unit 11, and a cover 30 are arranged in a groove 103 of the frame 12 in the display device 10, as illustrated in a lower part of FIG. 6. The cover 30 is formed of transparent resin or transparent glass, and protects the display unit 11.

On the other hand, in a portion on the right side of FIG. 5, a flexible substrate 32 on which various types of electronic components 31 are arranged, the display unit 11, and the cover 30 are arranged outward from the peripheral surface of the frame 12 in the display device 10, as illustrated in an upper part of FIG. 6. The various types of electronic components 31 and the flexible substrate 32 constitute the controller 14, the oscillator 15, the external memory 16, the sensor 17, and the communication unit 18. As shown in FIG. 5, the display unit 11 has an inner periphery 100, a fold 101 integrally connecting with one end of the inner periphery 100, and an outer periphery 102 arranged along a peripheral surface over substantially its entire circumference (approximately 360°). Further, as shown in FIG. 5, the power supply 13 and the flexible substrate 32 are electrically connected to each other through a power supply connector 33. The flexible substrate 32 and the display unit 11 are electrically connected to each other through the connector 24, so that the controller 14 on the flexible substrate 32 and the display unit 11 are electrically connected to each other. The power supply 13 and the flexible substrate 32 are arranged in different portions on the peripheral surface of the frame 12, thereby allowing the thickness of the frame to be reduced.

The operations of the display device 10 will be then described.

Figure 7:
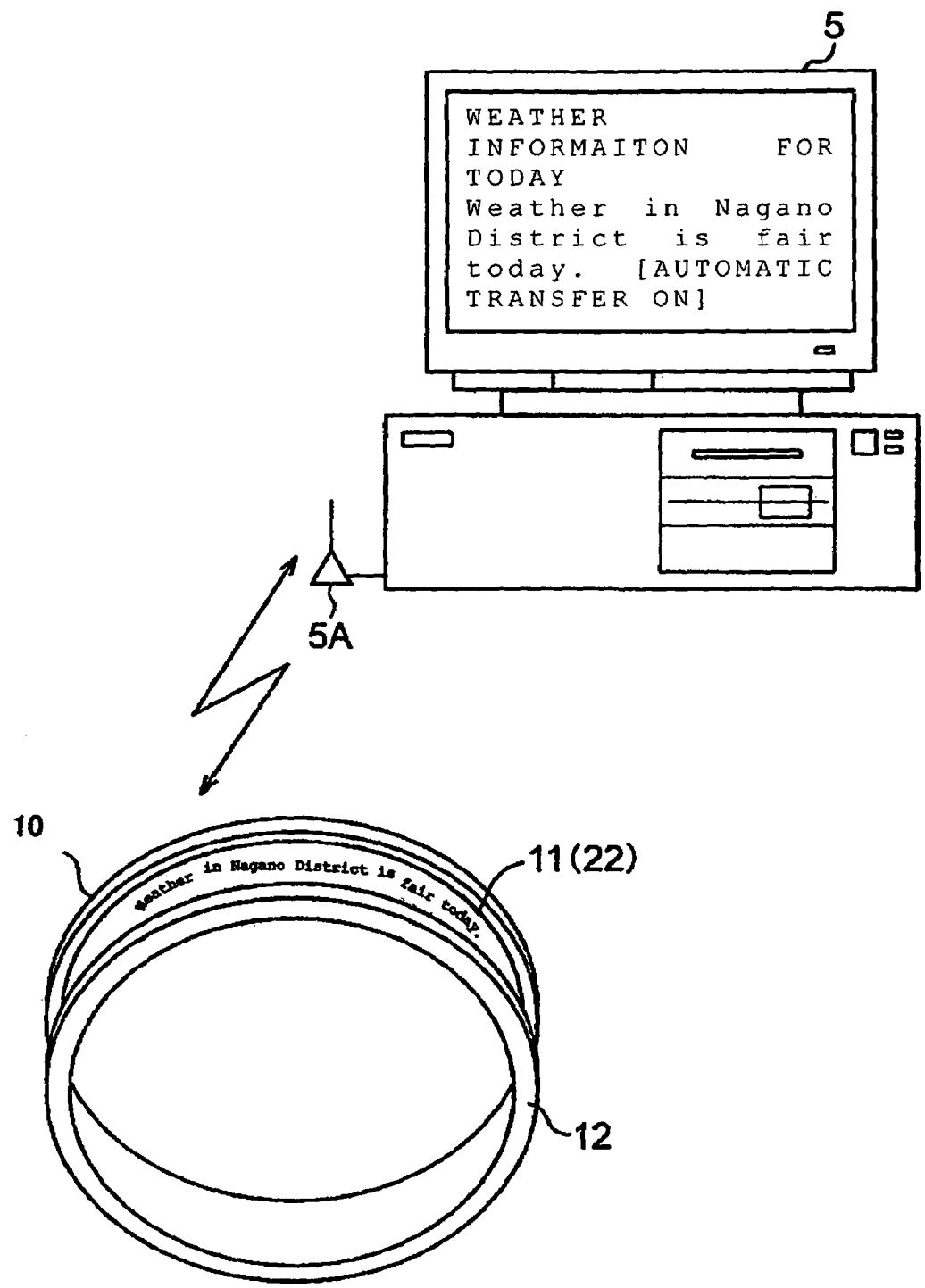
FIG. 7 is an explanatory view showing operations in the first embodiment.

FIG. 7 is an explanatory view showing the operations in the present embodiment. When display data is transmitted (transferred) through a communication antenna 5A in the communication unit 5 which is external equipment, the communication unit 18 in the display device 10 performs short-distance radio communication to receive the display data and transfer the received display data to the external memory 16 under control of the controller 14. In the controller 14, the MPU performs processing on the basis of a control program stored in the ROM at timing based on the reference oscillation signal generated by the oscillator 15, and transfers the display data to the display unit 11 through the connector 24. The transfer of the control program and the display data to the display device 10 from the external equipment such as the communication unit 5 can be also performed manually or performed automatically. Further, in a case where the transfer is performed automatically, the display data can be automatically updated when the display device 10 leads to a communication allowable range of the external equipment.

When the display data is transferred to the display unit 11, the driver circuit 23 in the display unit 11 drives the display panel 22, to display an image corresponding to the display data (a character string "Weather in the Nagano district is fair today" in FIG. 7) on the display panel 22. As a display form at this time, a character string is displayed while turning around the peripheral surface of the display device 10 such that it flows from a first direction (a rightward direction) to a second direction (a leftward direction), as on an electric bulletin board.

If display is inverted in a case where the display device 10 is mounted on a user, an inversion instruction is inputted to the controller 14 through the sensor 17 by performing a predetermined operation such as an operation for strongly swinging his or her arm three times, so that normal display is performed. The flow of the characters can be stopped or resumed by a predetermined operation.

As described in the foregoing, according to the present embodiment, display can be performed along the peripheral surface of the display device 10 over substantially its entire circumference, thereby allowing the amount of display data to be increased.

Furthermore, according to the present embodiment, various types of display forms can be realized using the peripheral surface of the display device 10 such that scenery seen from a certain point is displayed over substantially the entire circumference of 360°.

According to the present embodiment, the display device 10 can be caused to have a high-grade feeling by arranging the display panel 22 without joints along the peripheral surface of the display device 10 over substantially its entire circumference and making the display panel 22 and the frame 12 feel united.

Furthermore, in a case where such a display device 10 is employed under situations where conversation cannot be carried out (e.g., in the water), information can be smoothly transmitted between persons spaced several meters to several ten meters apart from each other.

[2] Second Embodiment

Although in the above-mentioned first embodiment, description was made of a case where the frame 12 in the display device 10 is in a complete ring shape, description is made of a case where a frame 12 has a hinge and has a foldable structure in a second embodiment. In the following description, a display device in the present embodiment is indicated by reference numeral 10A in order to distinguish the display device from the display device 10 in the first embodiment.

Figure 8:
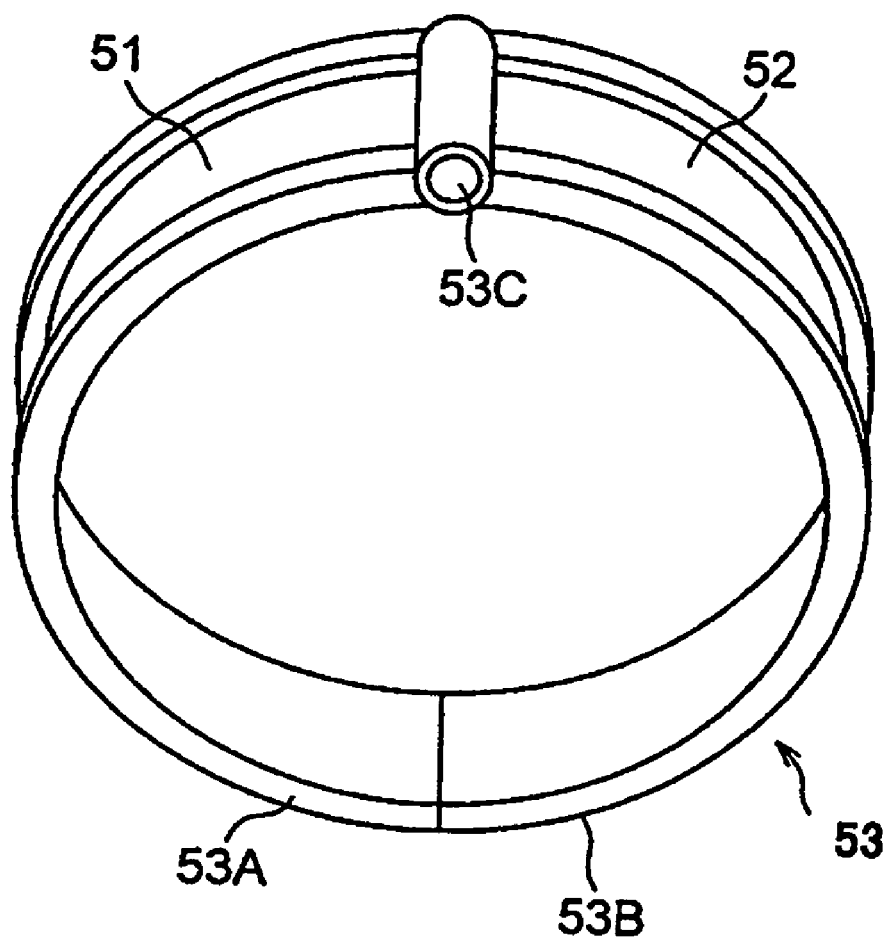
FIG. 8 is a perspective view showing the appearance of a display device according to a second embodiment.

FIG. 8 is a perspective view showing the appearance of the display device 10A according to the present embodiment.

The display device 10A has a first display unit 51 for displaying various types of information, a second display unit 52 for displaying various types of information, and a frame 53 if it is roughly divided. The frame 53 has a bobbin shape, is mounted on the arm of a user, and supports the display units 51 and 52. The frame 53 is constructed such that a first frame 53A and a second frame 53B are rotatable through a hinge 53C. The inner diameter of the frame 53 is taken as 50 to 70 mmϕ in a case where a bracelet is assumed.

Figure 9:
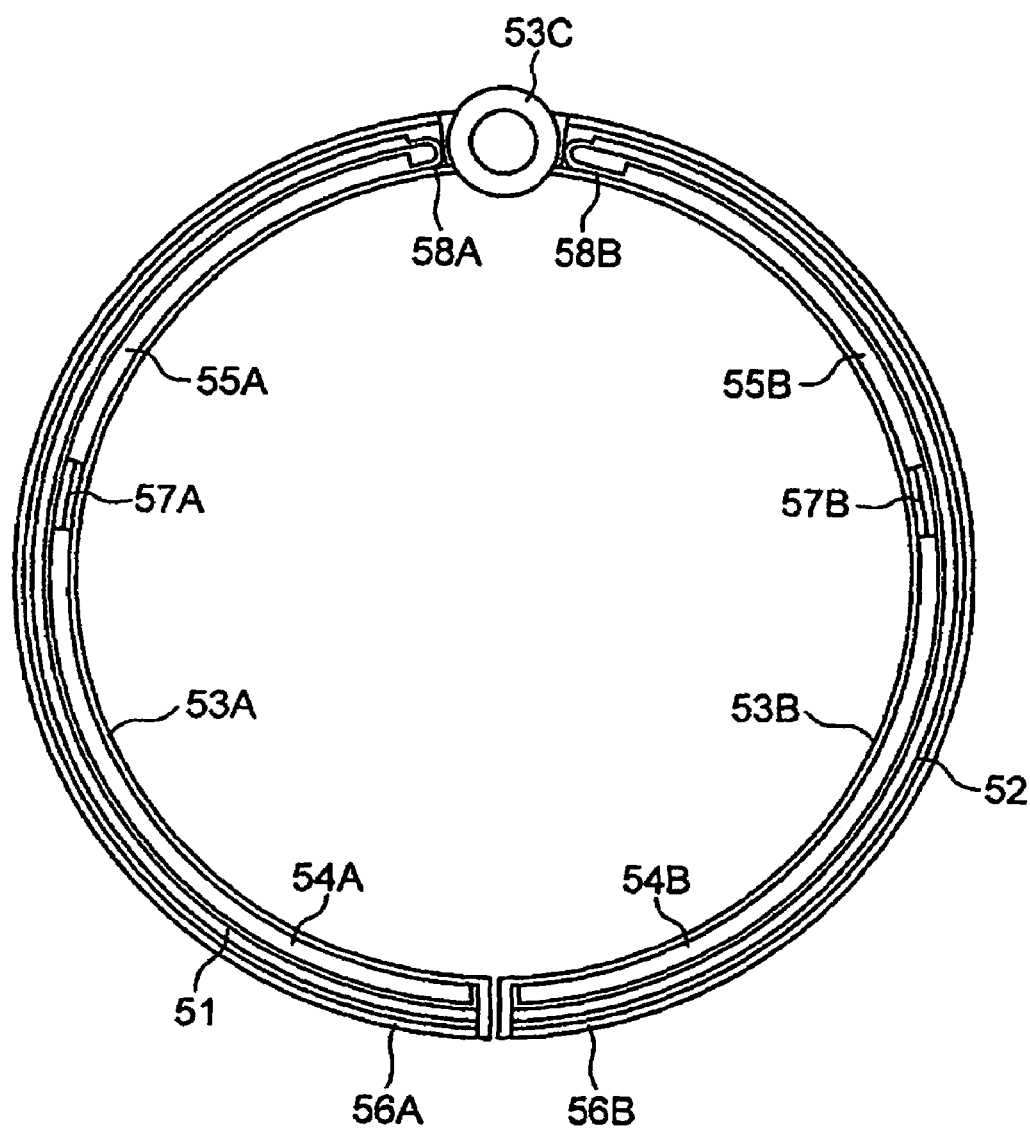
FIG. 9 is a sectional end view of a display device shown in FIG. 8.

FIG. 9 is a sectional end view of the display device 10A shown in FIG. 8.

In the first frame 53A, a flexible substrate 55A having a power supply 54A and various types of electronic components (not shown) arranged therein is arranged so as to almost come into contact with its peripheral surface, and the power supply 54A and the flexible substrate 55A are electrically connected to each other through a power supply connector 57A. Further, the first display unit 51 and a cover 56A are arranged in the direction away from the peripheral surface. The flexible substrate 55A and the first display unit 51 are electrically connected to each other through a connector 58A, and the cover 56A is formed of transparent resin or transparent glass to protect the first display unit 51. In the second frame 53B, a flexible substrate 55B having a power supply 54B and various types of electronic components (not shown) arranged therein is arranged so as to almost come into contact with its peripheral surface, and the power supply 54B and the flexible substrate 55B are electrically connected to each other through a power supply connector 57B. Further, a second display unit 52 and a cover 56B are arranged in the direction away from the peripheral surface. The flexible substrate 55B and the second display unit 52 are electrically connected to each other through a connector 58B, and the cover 56B is also formed of transparent resin or transparent glass to protect the second display unit 52.

In the above-mentioned configuration, the configuration of the flexible substrates 55A and 55B is the same as that of the flexible substrate 32, where a controller, an oscillator, an external memory, a sensor, and a communication unit are formed.

Although the operations of the display device 10A in the present embodiment are the same as those of the display device 10 in the first embodiment, synchronous display must be performed between the first display unit 51 and the second display unit 52, so that synchronous display is performed through a communication unit 18.

As described in the foregoing, according to the present embodiment, display can be performed along a peripheral surface of the display device 10A over substantially its entire circumference, thereby allowing the amount of display data to be increased, as in the first embodiment. Furthermore, according to the present embodiment, various display forms are feasible using the peripheral surface of the display device 10A, for example, scenery is displayed over substantially its entire circumference of 360°.

According to the present embodiment, the first and second frames 53A and 53B are connected to each other by the hinge 53C to constitute the frame 12, and the first and second display units 51 and 52 respectively provided in the first and second frames 53A and 53B perform communication for synchronous display through the communication unit 18. Therefore, a series of displays can be performed over substantially the entire circumference of the display device 10A.

[3] Third Embodiment

A third embodiment of the present invention will be then described. In the present embodiment, description is made of a configuration in which a plurality of display devices can be synchronized and cooperated with one another, and are integrated to allow an image to be displayed.

Figure 10:
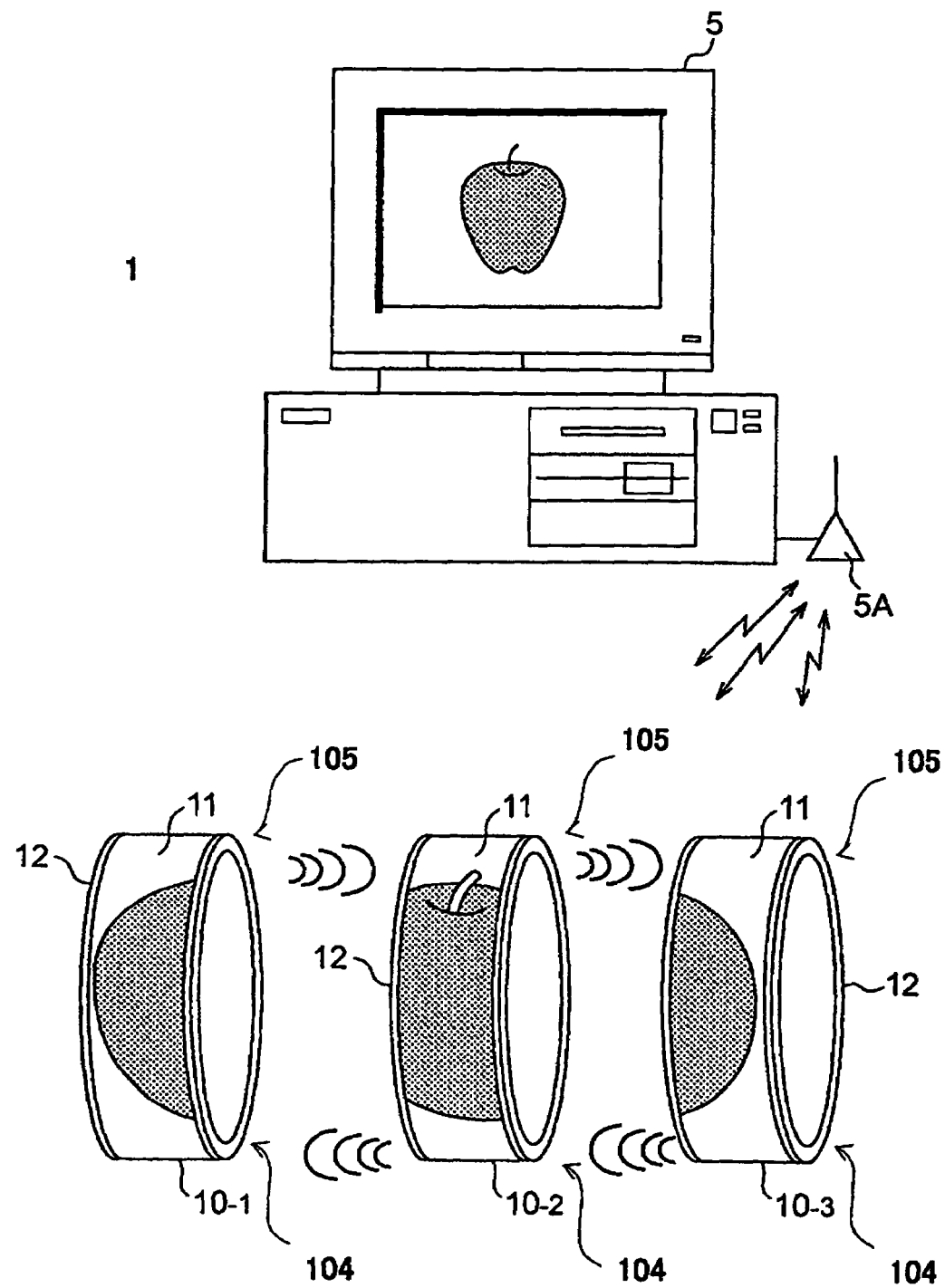
FIG. 10 is a diagram showing the schematic configuration of a third embodiment.

FIG. 10 is a diagram schematically showing the configuration of a display device system 1 according to the present embodiment. In FIG. 10, a case where three display devices are mounted on the arm of a user is illustrated. As shown in FIG. 10, the display device system 1 has a communication unit 5 and display devices 10-1, 10-2, and 10-3 if it is roughly divided. The communication unit 5 is external equipment corresponding to the display devices 10-1, 10-2, and 10-3, and previously stores display data to be displayed by the display devices 10-1, 10-2, and 10-3 and transmits (transfers) the display data through a communication antenna 5A. The display devices 10-1, 10-2, and 10-3 respectively display images which are synchronized with one another on the basis of the display data from the communication unit 5.

Figure 11:
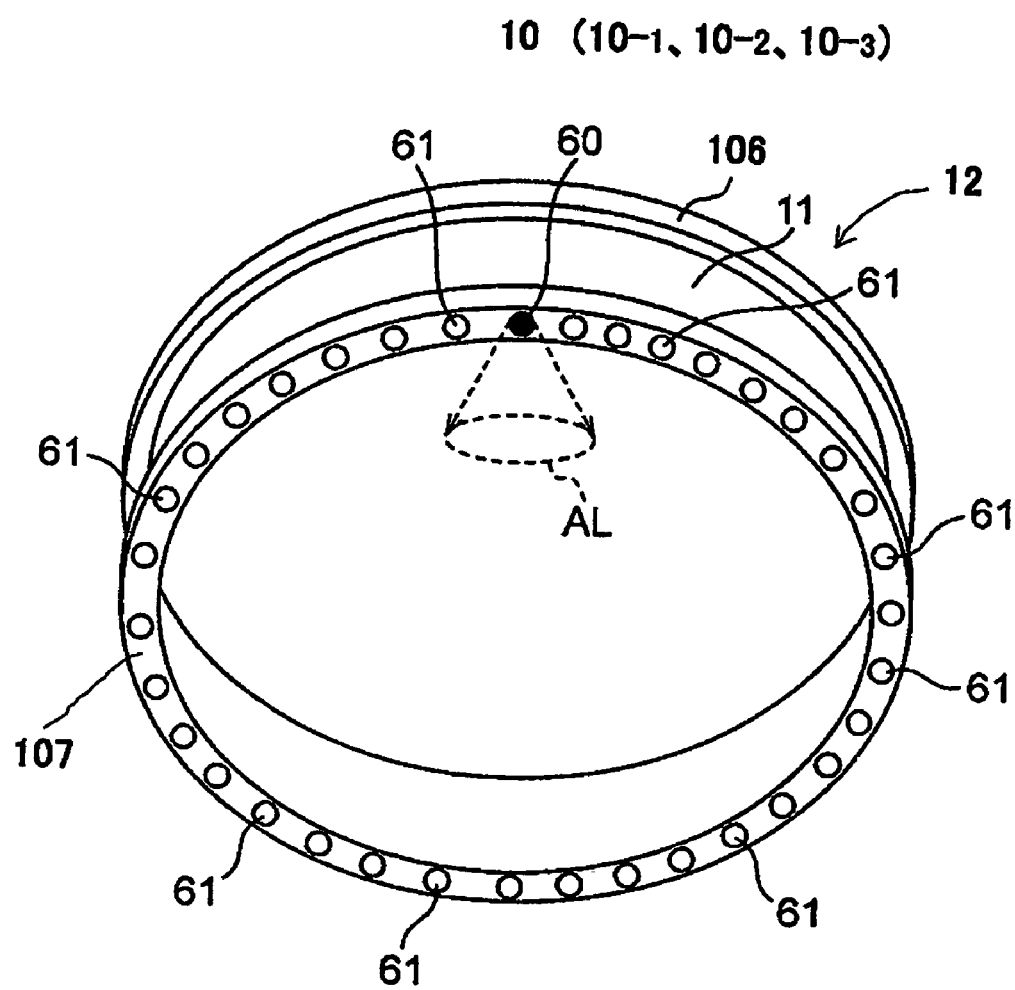
FIG. 11 is an explanatory view showing the configuration of a sensor in a case where it functions as a rotational position detector.

The display devices 10-1, 10-2, and 10-3 (hereinafter referred to as a "display device 10" when they are not particularly distinguished) have the same configuration as the display device 10 in the first embodiment except for the following points. That is, the display device 10 according to the present embodiment differs from the display device 10 in the first embodiment in that a sensor 17 has a function serving as an operation unit, a function serving as a rotational position detector, and a receiver 104 and a transmitter 105 permitting short-distance radio communication having directivity. When the sensor 17 functions as the operation unit, it has an acceleration sensor, a gyro sensor, etc., for example, as a sensor, and detects a state where the user swings his or her arm, for example, to perform various types of operations such as selection of a display image and start/stop of display. When the sensor 17 functions as the rotational position detector, at least one LED 60 and a plurality of photodiodes 61 are provided on each of both side surfaces of the display device, as shown in FIG. 11, for example, as a sensor. In FIG. 11, one LED 60 and 36 photodiodes 61 are arranged. In a case where communication is performed, the LED 60 is operated as the transmitter 105, and the photodiodes 61 are operated as the receiver 104, to perform short-distance radio communication between the adjacent display devices 10.

The communication unit 18 performs short-distance radio communication, to receive display data from external equipment such as the communication unit 5, a dedicated image transfer device, or an image management system and transfer the received display data to an external memory 16 under control of the controller 14.

As the display device 10 according to the present embodiment, the display device 10A in a second form in which a frame 12 has a hinge and has a folding structure as shown in the second embodiment can be used in addition to a first form in which the frame 12 has a complete bobbin shape as shown in the first embodiment. In the display device 10A in the second form, a first display unit 51 and a second display 52 respectively function as sub-display units, and both the display units together function as a display unit. In the display device 10A in the second form, the first display unit 51 and the second display unit 52 communicate with each other through a receiver 104 and a transmitter 105, and synchronous display is performed between the first display unit 51 and the second display unit 52.

Description is then made of the principle of a rotational position detecting function for synchronizing and cooperating images among the plurality of display devices 10-1, 10-2, and 10-3.

FIG. 11 is an explanatory view showing an example of an arrangement of an outer peripheral surface 106, a side peripheral surface, the LED 60 serving as a rotation detector, and the photodiodes 61 in the frame 12. In the following description, the position where the LED 60 in the display device 10-1 is provided and the position where the LED 60 in the display device 10-2 is provided are respectively taken as reference positions for the display devices 10-1 and 10-2. The position of a display screen corresponding to the position where the LED 60 in the display device 10-2 is provided is taken as the display reference position of the plurality of display devices 10-1 to 10-3.

When the LED 60 in the display device 10-2 emits light, the plurality of photodiodes 61 in the display device 10-2 do not detect the light. At this time, the plurality of photodiodes 61 in the display device 10-1 enter a state where the light emitted by the LED 60 in the display device 10-2 can be received.

If the direction of emission of the light by the LED 60 in the display device 10-2 has a certain degree of directivity, and a range in which the light is emitted (an irradiation range) is a light emission range AL, as shown in FIG. 11, for example, therefore, only the plurality of (e.g., two to three) photodiodes adjacent to one another out of 36 photodiodes 61 in the display device 10-1 can receive light. If the center of arrangement positions of the photodiodes 61 which can receive light is taken as the arrangement position of the LED 60 in the display device 10-2, the display device 10 can perform display by taking the position where the LED 60 in the display device 10-2 is provided as the display reference position, and can display an image, which is hardly shifted from the image displayed by the display device 10-2 and is synchronized and cooperated therewith.

Figure 12:
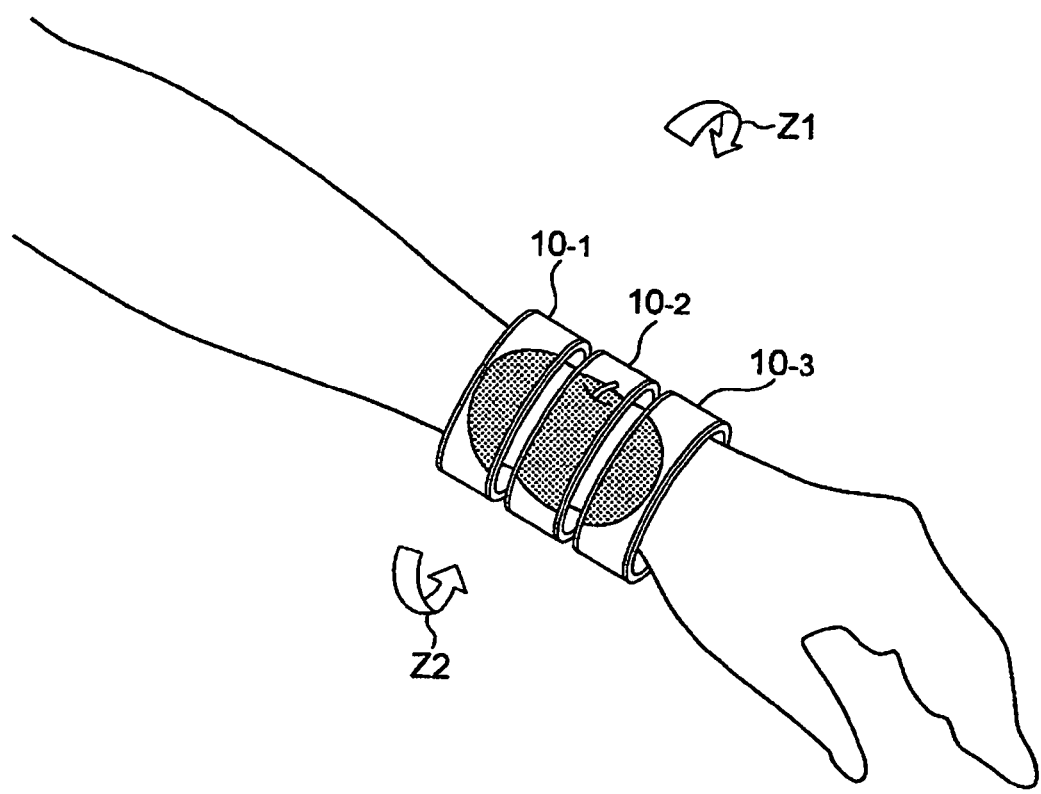
FIG. 12 is an explanatory view showing an example of display of a display image at the time of mounting of a display device.

FIG. 12 is an explanatory view showing an example of display of a display image in a case where a display device is mounted.

A case where the display device 10-2 is fixed in the state shown in FIG. 12 is illustrated. In this case, even if the display device 10-1 and the display device 10-3 are respectively independently rotated in either a direction indicated by an arrow Z1 or a direction indicated by an arrow Z2, the display device 10-1 and the display device 10-3 correct the position where an image is displayed by taking the position where the LED 60 in the display device 10-2 is provided as a display reference position. Therefore, an apple is always integrally displayed.

As an actual display state, even if the display device 10-2 is rotated in either the direction indicated by the arrow Z1 or the direction indicated by the arrow Z2 independently of the display device 10-1 and the display device 10-3, therefore, the position where an apple is displayed is only moved as the display device 10-2 is rotated, so that an image representing the apple is displayed as a whole.

The operations of the display device 10 will be then described.

Figure 13:
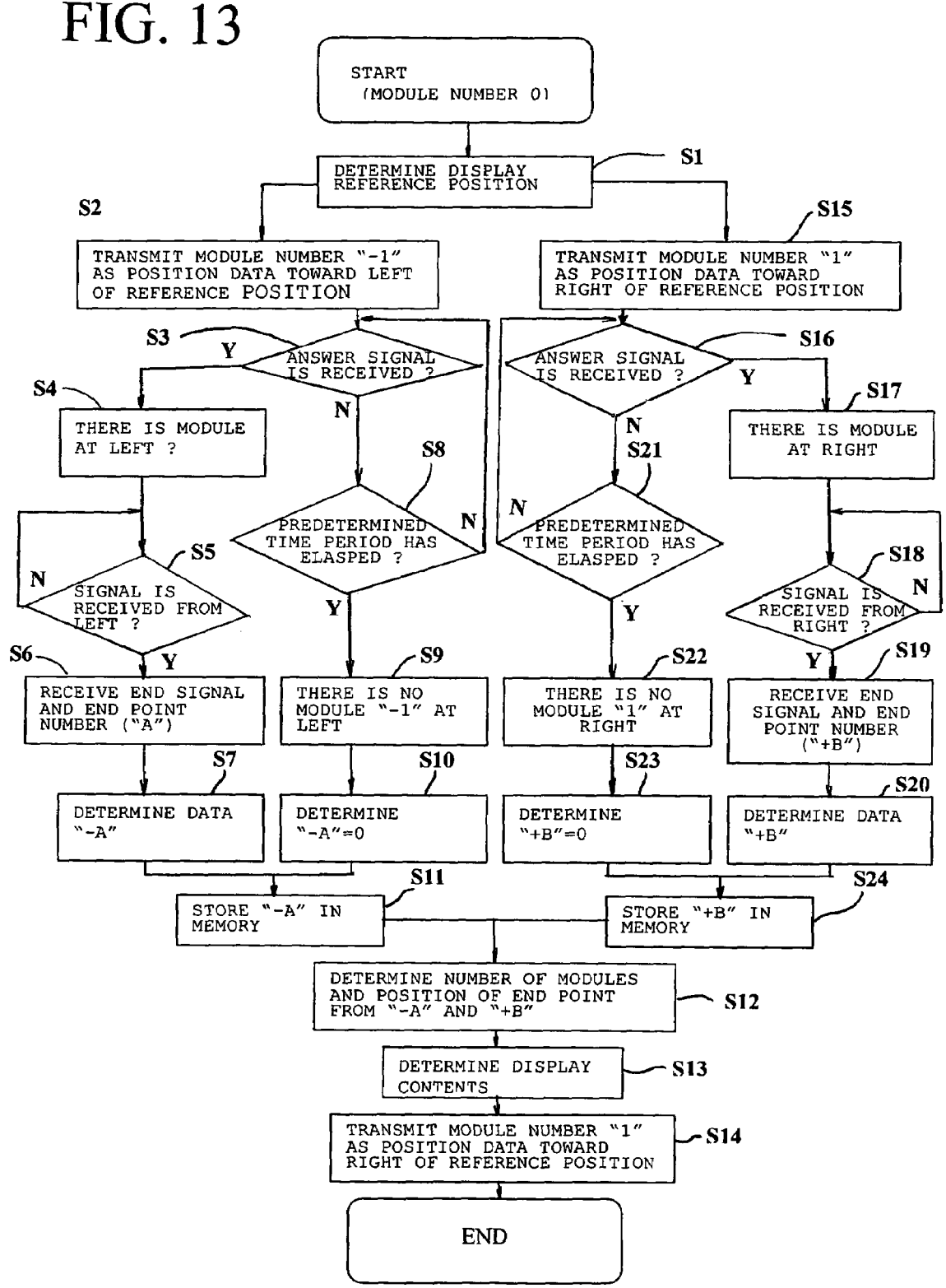
FIG. 13 is a flow chart showing processing of a display device in which a display reference position is set.
Figure 14:
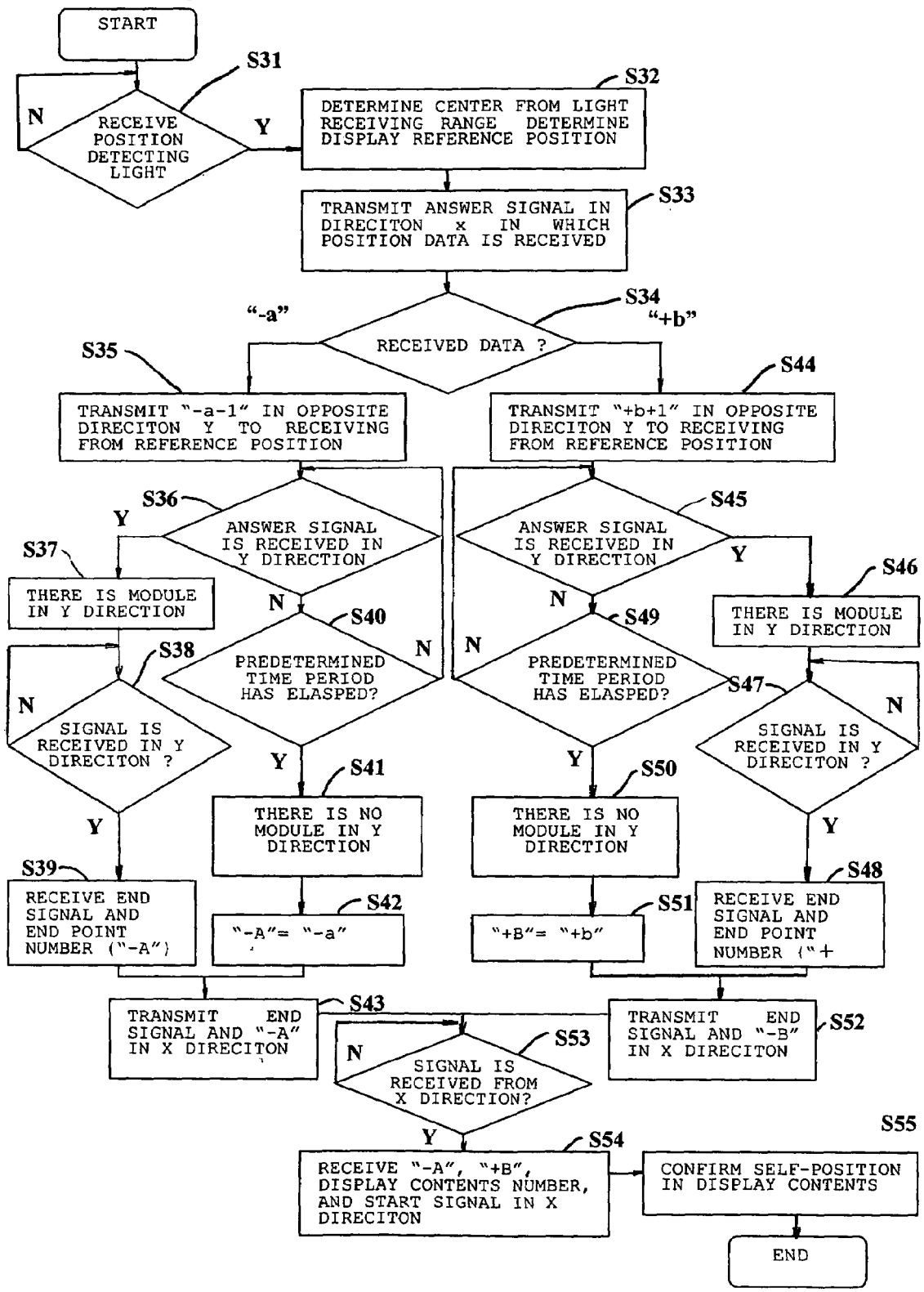
FIG. 14 is a flow chart showing processing of a display device in which display is corrected on the basis of a display reference position.

FIG. 13 is a flow chart showing processing performed by the display device 10 in which the display reference position is set. In the following description, it is assumed that the processing is performed by the display device 10-2. FIG. 14 is a flow chart showing processing performed by the display device 10 for correcting display on the basis of a display reference position. In the following description, it is assumed that the processing shown in FIG. 14 is performed by the display device 10-1 and the display device 10-3.

The display devices 10-1 to 10-3 which should display an image in cooperation with one another shall store as self-position specification information a module number=0 serving as central position specification information indicating that the display device is arranged at a substantially central position out of the plurality of display devices 10-1 to 10-3 in their internal state.

As shown in FIG. 13, the display device 10-2 first starts display reference position determination processing (step S1).

The controller 14 in the display device 10-2 then transmits, with respect to a display screen formed into a substantial cylinder by the display panels 22 of the plurality of display devices 10-1 to 10-3 which should display an image in cooperation with one another, a module number=−1 as self-position specification information (written as position data in the drawings) for specifying, when the display device 10-1 exists in a first direction (a leftward direction in FIGS. 12 and 13) along an axis of rotation of the substantial cylinder (because the existence is not determined in the initial state), the position of the display device 10-1.

On the other hand, the controller 14 in the display device 10-1 judges whether or not the photodiodes 61 constituting the sensor 17 receive light emitted by the LED 60 in the display device 10-2, as shown in FIG. 14 (step S31).

Thus, the controller 14 in the display device 10-1 determines the display reference position by the above-mentioned method from a light receiving range (step S32).

The controller 14 in the display device 10-1 then transmits, when it receives the self-position specification information through the sensor 17, an answer signal indicating that the self-position specification information (the module number=−1) is received in a direction X in which the self-position specification information is received (a rightward direction in FIG. 12 in this case) (step S33).

The controller 14 in the display device 10-1 then judges whether the received self-position specification information is a negative value (indicated by −a) or a positive value (indicated by +b) (step S34).

The display device 10-1 receives the module number −1 as the self-position specification information this time, and the received self-position specification information takes a negative value, a module number=−a−1, i.e., a module number=−2 is transmitted through the sensor 17 as the self-position specification information in an opposite direction Y (a leftward direction as viewed from the display device 10-2 in FIG. 2) to the direction in which the self-position specification information is received (the display device 10-2 is positioned) (step S35).

The display device 10-1 then judges whether or not the same answer signal as that transmitted in the step S33 is received in the Y direction (the leftward direction as viewed from the display device 10-2) (step S36).

Since the other display device 10 exists on the left side of the display device 10-1 this time (No in step S36), the processing proceeds to the step S40. It is determined whether or not a predetermined time period has elapsed (step S40). Thereafter, when the predetermined time period has elapsed (Yes in step S40), no other display device 10 exists in the Y direction as viewed from the display device 10-1, so that the display device 10-1 is taken as a display device 10 positioned at an end in the Y direction (step S41).

The controller 14 in the display device 10-1 takes its own self-position specification information (a module number=−1) as self-position specification information −A relating to the display device at the end position (step S42) That is, −A=−a (=−1).

The controller 14 in the display device 10-1 transmits an END signal serving as terminal end information and the self-position specification information −A relating to the display device at the end position in the X direction in which the display device 10-2 is positioned (in a rightward direction as viewed from the display device 10-1) through the sensor 17 (step S43).

In a case where the answer signal is received in the Y direction (Yes in step S36), the other display device 10 exists on the left side of the display device 10-1 (step S37), so that the controller 14 in the display device 10-1 waits until a signal is received from the left (step S38).

When a self-position specification information −A corresponding to the display device 10 at the end position which is positioned on the left side of the display device 10-1 and an END signal are received (step S39), the controller 14 in the display device 10-1 transmits the received END signal and the self-position specification information −A relating to the display device 10 at the end position in the rightward direction in which the display device 10-2 is positioned through the sensor 17 (step S43).

On the other hand, the controller 14 in the display device 10-2 judges whether or not an answer signal is received (step S3). In this case, the display device 10-1 exists, so that the answer signal is received (Yes in step S3).

The controller 14 in the display device 10-2 then waits until a signal is received from the left (step S5), assuming that the other display device 10 exists on the left side of the display device 10-2 (step S4).

Thereafter, the controller 14 in the display device 10-2 receives the signal from the left (Yes in step S5), to receive an END signal serving as terminal end information on the left side and the self-position specification information −A relating to the display device at the end position (step S6).

The controller 14 in the display device 10-2 determines the self-position specification information −A relating to the display device at the end position (the display device 10-1 in the above-mentioned example), and stores the self-position specification information −A in a memory (step S11).

When no answer signal is received in the judgment in the step S3 (No in step S3), the controller 14 in the display device 10-2 repeats the processing in the steps S8 and S3 until a predetermined time period has elapsed. When the predetermined time period has elapsed in the judgment in the step S8, the controller 14 in the display device 10-2 judges that no other display device 10 exists on the left side of the display device 10-2 (step S9), determines the self-position specification information −A as 0, assuming that the display device at the end position is the display device 10-2 (step S10), and stores the self-position specification information −A in a memory (step S11).

Furthermore, the controller 14 in the display device 10-2 performs the following processing in parallel with the foregoing processing in the steps S1 to S11 or successively from the termination of the foregoing processing in the steps S1 to S11. That is, the controller 14 in the display device 10-2 transmits, with respect to a display screen formed into a substantial cylinder by the display panels 22 of the plurality of display devices 10-1 to 10-3 which should display an image in cooperation with one another, a module number=1 as self-position specification information for specifying, when the display device 10-3 exists in a second direction (a rightward direction in FIGS. 12 and 13) along an axis of rotation of the substantial cylinder (because the existence is not determined in the initial state), the position of the display device 10-3 (step S15).

On the other hand, the controller 14 in the display device 10-3 judges whether or not the photodiodes 61 constituting the sensor 17 receive light emitted by the LED 60 in the display device 10-2 (step S31).

Thus, the controller 14 in the display device 10-1 determines the display reference position by the above-mentioned method from a light receiving range (step 32).

The controller 14 in the display device 10-3 then transmits, when it receives self-position specification information (a module number=1) through the sensor 17, an answer signal indicating that the self-position specification information is received in a direction X in which the self-position specification information is received (a leftward direction in FIG. 12 in this case) (step S33).

The controller 14 in the display device 10-3 then judges whether the received self-position specification information is a negative value (indicated by −a) or a positive value (indicated by +b) (step S34).

The self-position specification information received by the display device 10-3 this time is the module number=1 and takes a positive value, so that the controller 14 in the display device 10-3 transmits a module number=b+1, that is, a module number=2 as the self-position specification in an opposite direction Y (a rightward direction in FIG. 12) to the direction in which the self-position specification information is received (the display device 10-2 is positioned) through the sensor 17 (step S44).

It is then judged whether or not the same answer signal as that transmitted in the step S33 is received in the Y direction (step S45).

Since no other display device 10 exists on the right side of the display device 10-3 (No in step S45) this time, the processing proceeds to the step S49. It is judged whether or not a predetermined time period has elapsed (step S49). Thereafter, when the predetermined time period has elapsed (Yes in step S40), no other display device 10 exists in the Y direction, so that the display device 10-3 is taken as a display device 10 positioned at an end in the Y direction (step S50).

The controller 14 in the display device 10-3 takes its own self-position specification information (a module number=+1) as self-position specification information +B relating to the display device at the end position (step S51). That is, B=b (=1).

The controller 14 in the display device 10-3 transmits an END signal serving as terminal end information and the self-position specification information +B relating to the display device at the end position in an X direction in which the display device 10-2 is positioned through the sensor 17 (step S52).

In a case where the answer signal is received in the Y direction (Yes in step S45), the other display device 10 exists in the Y direction (step S46), so that the controller 14 in the display device 10-3 waits until a signal is received in the Y direction (step S47).

When self-position specification information +B corresponding to the display device 10 at the end position which is positioned in the Y direction and an END signal are received (step S48), the controller 14 in the display device 10-3 transmits the received END signal and the self-position specification information B relating to the display device 10 at the end position in the X direction in which the display device 10-2 is positioned through the sensor 17 (step S52).

On the other hand, the controller 14 in the display device 10-2 judges whether or not an answer signal is received (step S3). In this case, the display device 10-3 exists, so that the answer signal is received (Yes in step S16).

The controller 14 in the display device 10-2 then waits until a signal is received from the right (step S18), assuming that the display device exists on the right side of the display device 10-2 (step S17).

Thereafter, the controller 14 in the display device 10-2 receives the signal from the right (Yes in step S18), to receive an END signal serving as terminal end information on the right side and the self-position specification information +B relating to the display device at the end position (step S19).

The controller 14 in the display device 10-2 judges the self-position specification information +B relating to the display device at the end position (the display device 10-3 in the above-mentioned example), and stores the self-position specification information +B in a memory (step S24).

When no answer signal is received in the judgment in the step S16 (No in step S163), the controller 14 in the display device 10-2 repeats the processing in the steps S21 and S16 until a predetermined time period has elapsed. When the predetermined time period has elapsed in the judgment in the step S21, the controller 14 in the display device 10-2 judges that no display device exists on the right side of the display device 10-2 (step S9), determines the self-position specification information +B as 0, assuming that the display device at the end position is the display device 10-2 (step S23), and stores the self-position specification information +B in a memory (step S24).

The controller 14 in the display device 10-2 then determines, from the self-position specification information −A and +B corresponding to the display devices at both the end positions, the number of display devices and both the end positions (step S12), and determines display contents (a display image) (step S13).

The controller 14 in the display device 10-2 transmits a content number for specifying the display contents (display image) to the self-position specification information −A and +B corresponding to the display devices at both the end positions and a start signal for starting display to the display device 10-1 and (or) the display device 10-3 which are (is) positioned on both sides (or one side).

On the other hand, the respective controllers 14 in the display devices 10-1 and 10-3 wait until signals are received in the X direction, that is, the direction in which the display device 10-2 exists (step S53), receive the signals from the display device 10-2 through respective sensors 17 in the display devices 10-1 and 10-3 (Yes in step S53), that is, receive the self-position specification information −A and +B corresponding to the display devices at both the end positions, the display contents (display images), and the start signal for starting display (step S54), and confirm their own positions in the display contents, that is, images to be displayed (step S55).

Specifically, there are three display devices 10, as shown in FIG. 12, so that it is confirmed that an image representing an apple is divided into three images, i.e., an image on the left side, an image at the center, and an image on the right side, and the display devices 10-1, 10-2, and 10-3 respectively display the image on the left side, the image at the center, and the image on the right side of the apple.

Thereafter, the display of the display image confirmed in the step S55 is started in synchronization with the transmission (in the case of the display device 10-2 in the above-mentioned example) or the receiving (in the cases of the display devices 10-1 and 10-3 in the above-mentioned example) of the start signal.

Figure 15:
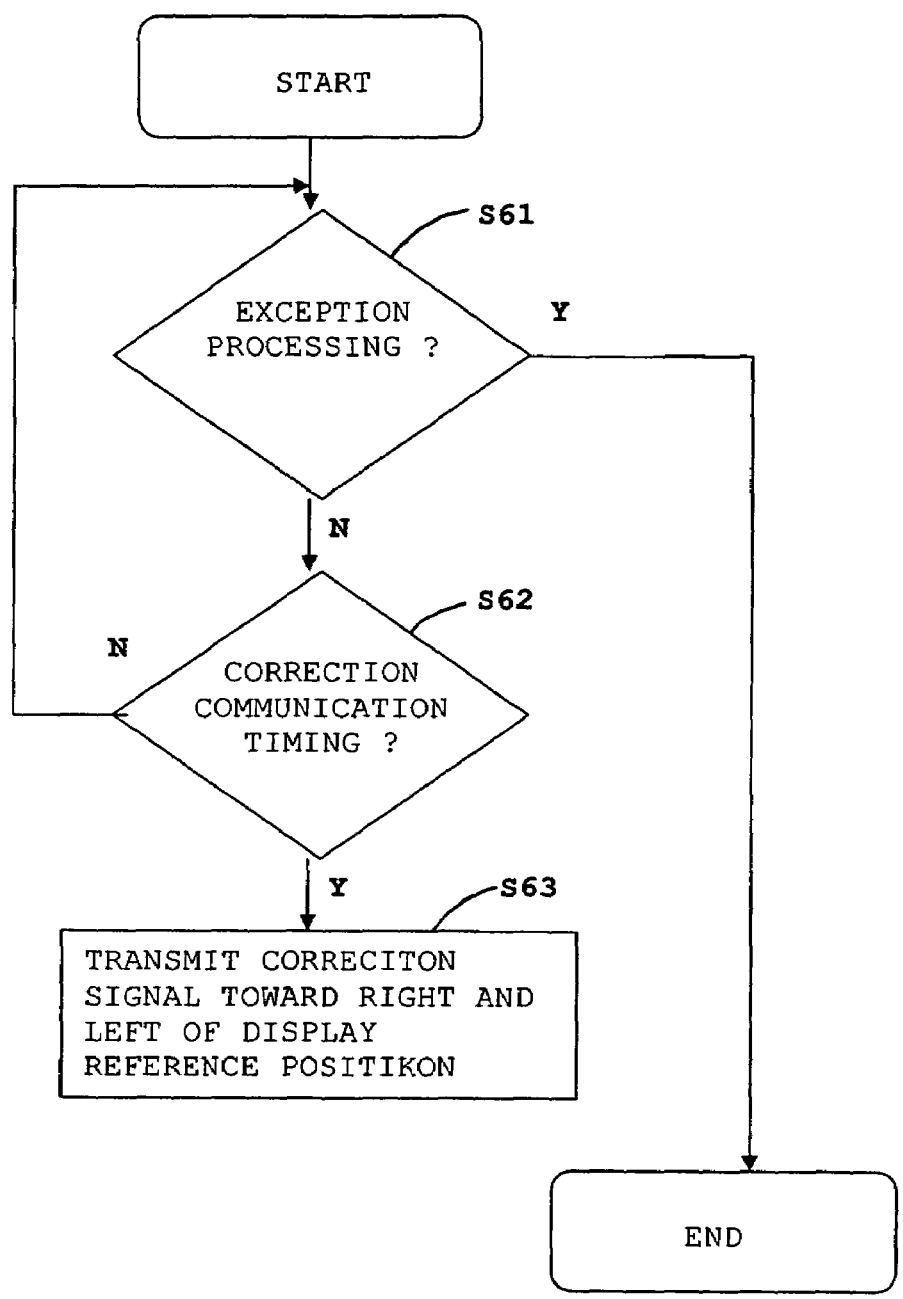
FIG. 15 is a flow chart showing display position correction processing of a display device in which a display reference position is set.

FIG. 15 is a flow chart showing processing for correcting the display position of a display device in which a display reference position is set. In the following description, it is assumed that the display device 10-2 performs the processing shown in FIG. 15.

The controller 14 in the display device 10-2 judges whether or not exception processing occurs in the display position correction processing of image display (step S61). When the exception processing occurs (Yes in step S61), the processing is terminated without performing the display position correction processing. When in the judgment in the step S6, the exception processing does not occur (No in step S61), the controller 14 in the display device 10-2 judges whether or not the timing is corrected communication timing (step S62). When in the judgment in the step S62, the timing has not been the corrected communication timing yet, the controller 14 in the display device 10-2 performs the same processing by advancing the processing to the step S61 again.

When in the judgment in the step S62, the timing leads to the corrected communication timing, the controller 14 in the display device 10-2 causes the LEDs 60 on both the side surfaces to emit light to irradiate the emitted light onto the display devices 10-1 and 10-3 as a correction signal (step S63), to perform the same processing by advancing the processing to the step S61 again.

Figure 16:
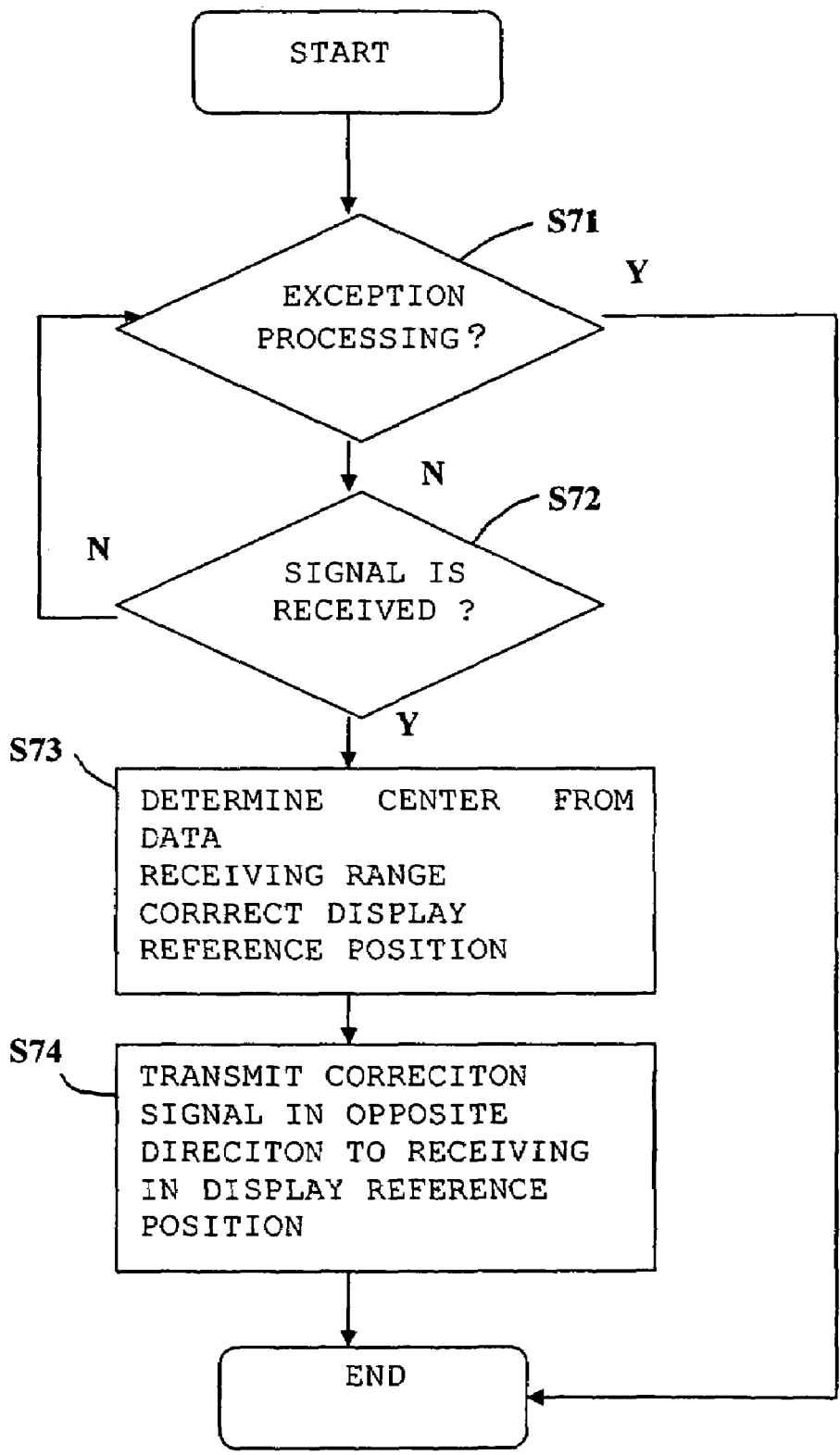
FIG. 16 is a flow chart showing display position correction processing of a display device in which display is corrected on the basis of a display reference position.

FIG. 16 is a flow chart showing processing for correcting the display position of a display device for correcting display on the basis of a display reference position. In the following description, it is assumed that the display device 10-1 and the display device 10-3 perform the processing shown in FIG. 16.

On the other hand, the controllers 14 in the display device 10-1 and the display device 10-3 judge whether or not exception processing occurs in display position correction processing of image display (step S71). When the exception processing occurs (Yes in step S71), the processing is terminated without performing the display position correction processing.

When in the judgment in the step S71, the exception processing does not occur (No in step S71), the controllers 14 in the display devices 10-1 and 10-3 judge whether or not a correction signal is received through the sensor 17 (step S72).

When in the judgment in the step S72, the correction signal has not been received yet, the controllers 14 in the display devices 10-1 and 10-3 perform the same processing by advancing the processing to the step S71 again.

When in the judgment in the step S72, the correction signal is received, only a plurality of (e.g., two to three) photodiodes 61 out of 36 photodiodes 61 in the display device 10-1 or the display device 10-3 can receive light, so that the center of the arrangement positions of the photodiodes 61 which can receive light is taken as the arrangement position of the LED 60 in the display device 10-2, to perform display by taking the position where the LED 60 in the display device 10-2 is provided as a display reference position (step S73). Thus, images which are hardly shifted from an image displayed by the display device 10-2 and are synchronized and cooperated therewith are displayed by the display devices 10-1 and 10-3.

The controller in each of the display devices 10-1 and 10-3 transmits a correction signal, similarly to that in the display device 10-2, in consideration with a case where the other display device 10 is connected (step S74).

As described in the foregoing, according to the present embodiment, in a plurality of small and portable display devices 10 which are mounted by a user, synchronization and cooperation are achieved among the display devices 10. Even if the display devices 10 are rotated, for example, an image can be displayed integrally by the display devices 10.

Although in the present embodiment, light is used in the sensor 17 in rotational position detection and transmission/receiving related to self-position specification data, and the communication unit 18 is used in transmission/receiving of control data, display data, etc., light can be also used in both the cases.

If the sensor 17 is caused to have only the rotational position detecting function, and the communication unit 18 can perform short-distance radio communication having directivity, the communication device 18 can be caused to have the function of transmission/receiving related to self-position specification data.

Although in the present embodiment, light is used in the rotational position detection, the rotational position detection can be performed using means such as a ultrasonic means, for example, having a certain degree of directivity.

[4] Fourth Embodiment

A fourth embodiment of the present invention will be then described. In the present embodiment, description is made of a configuration in which a plurality of display devices can be synchronized and cooperated with one another, and are integrated to allow an image to be displayed. More specifically, in the above-mentioned third embodiment, the plurality of display devices 10 are synchronized and cooperated with one another to respectively display a plurality of images obtained by dividing one image, so that the display devices 10 are integrated to display one image. Contrary to this, in the present embodiment, description is made of a configuration in which a plurality of display devices 10 respectively display different images, and are synchronized and cooperated with one another to control image display.

Figure 17:
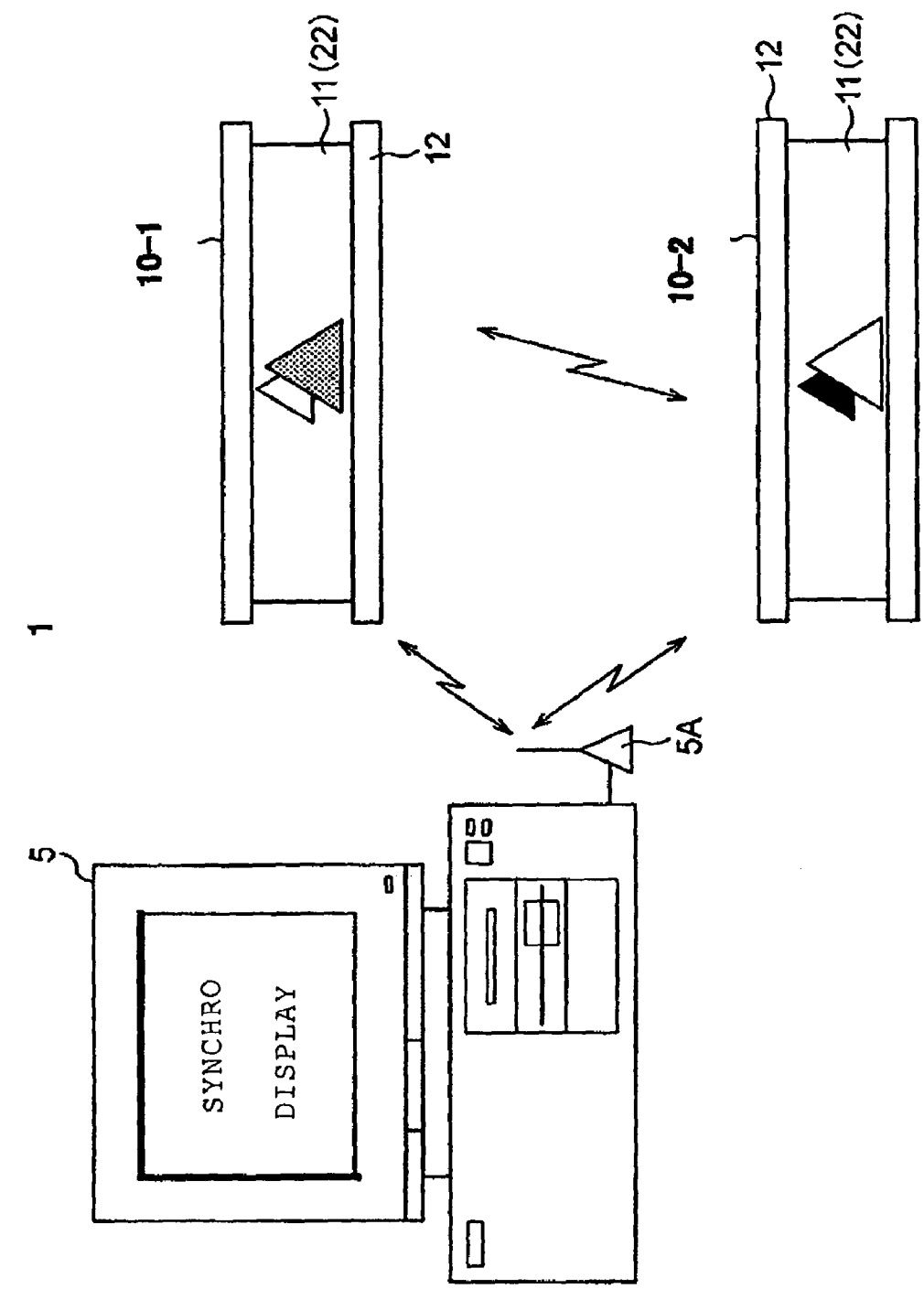
FIG. 17 is an explanatory view showing operations in a fourth embodiment.

FIG. 17 is a diagram schematically showing the configuration of a display device system 1 according to the present embodiment. FIG. 17 illustrates a case where the displays of display devices 10-1 and 10-2 respectively mounted on two users are synchronized with each other. As shown in FIG. 17, the display device system 1 has a communication unit 5 and a plurality of display devices 10-1 and 10-2 if it is roughly divided. The communication unit 5 is external equipment corresponding to the display devices 10-1 and 10-2, and previously stores a program to perform synchronous display between the display devices 10-1 and 10-2 and display data and transmits (transfers) the display control program and the display data to the display devices 10-1 and 10-2 through a communication antenna 5A. Thus, the display devices 10-1 and 10-2 perform image displays which are synchronized with each other on the basis of a game program and display data from the communication unit 5.

Although the display devices 10-1 and 10-2 have approximately the same configuration as that of the above-mentioned display device in the first embodiment, they differ in that the displays are synchronized with each other. In the following description, the display devices 10-1 and 10-2 are written as a display device 10 when they are not particularly distinguished.

As the display device 10 according to the present embodiment, a display device 10A according to a second form having a folding structure in which a frame 12 has a hinge as in the second embodiment can be used in addition to a display device in a first form in which a frame 12 has a complete bobbin shape as in the first embodiment. In the display device 10A in the second form, a first display unit 51 and a second display unit 52 respectively function as sub-display units, and both the display units together function as a display. Further, in the display device 10A in the second form, the first display unit 51 and the second display unit 52 communicate with each other through a receiver 104 and a transmitter 105, to perform synchronous display between the first display unit 51 and the second display unit 52.

The operations of the display device 10 will be then described. In the description of the operations, description is made of a case where the display devices 10-1 and 10-2 are mounted on two users, to perform displays which are synchronized with each other between the display devices 10-1 and 10-2.

Figure 18:
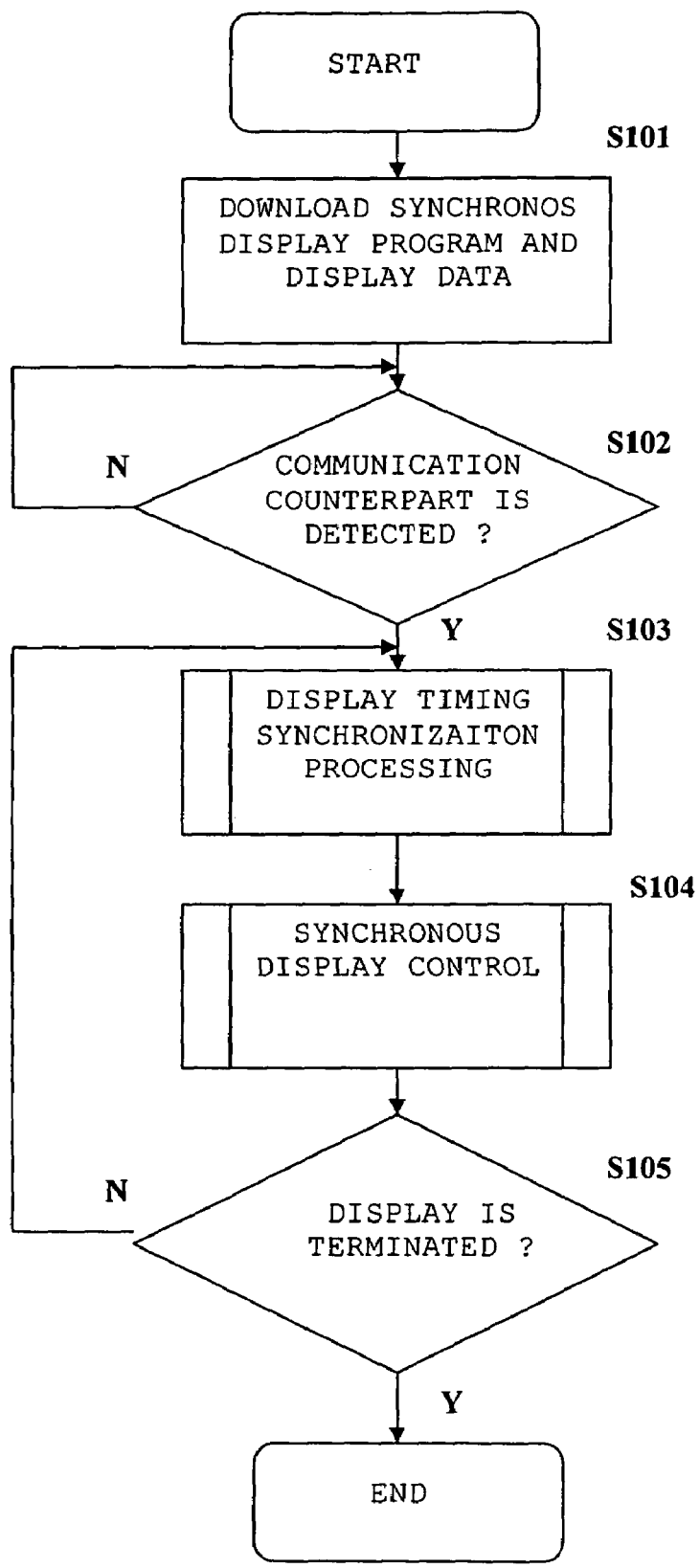
FIG. 18 is a flow chart showing processing in the fourth embodiment.

FIG. 18 is a flow chart showing an embodiment.

When a game program and display data are transmitted (transferred) through the communication antenna 5A in the communication unit 5 which is external equipment by an instruction from a user, communication units 18 in the display devices 10-1 and 10-2 perform short-distance radio communication to download (receive) a synchronous display program (a control program) and the display data (step S101). The synchronous display program (control program) and the display data are transferred to the external memory 16 under control of the controller 14. In the controller 14 in each of the display devices 10-1 and 10-2, a MPU performs processing on the basis of a synchronous display program stored in a RAM and a control program previously stored in a ROM at timing based on a reference oscillation signal generated by an oscillator 15, to transfer the display data to the display unit 11 through a connector 24.

The transfer of the control program and the display data from the communication unit 5 to the display devices 10-1 and 10-2 can be also performed manually or can be performed automatically. Further, in a case where the transfer is performed automatically, the synchronous display program and the display data can be also updated when the display device 10 leads to a communication allowable range of the external equipment. By such a configuration, applications such as a change in the contents of display of images which are synchronously displayed are allowed depending on places in an auditorium in a concert hall, for example.

The controller 14 in each of the display devices 10-1 and 10-2 then judges whether or not a communication counterpart which is an object to be synchronized is detected (step S102). A case where the communication counterpart is detected means a case where each of the display devices 10-1 and 10-2 exists within a predetermined distance (within a distance at which mutual communication can be performed) and a case where identification numbers are previously assigned to the display devices 10-1 and 10-2, and there is a communication request from the display device having the identification number registered as the communication counterpart.

When in the judgment in the step S102, the communication counterpart is not detected (No in step S102), each of the display devices 10-1 and 10-2 enters a stand-by state.

On the other hand, when in the judgment in the step S102, the communication counterpart is detected (Yes in step S102), each of the display devices 10-1 and 10-2 performs display timing synchronization processing such that their respective display timings are synchronized with each other (step S103). Specifically, each of the display devices 10-1 and 10-2 generates a display timing clock using a communication synchronization timing as a basis in order to synchronize the display timing with the communication synchronization timing, for example. A driver circuit 23 in the display unit 11 provided in each of the display devices 10-1 and 10-2 drives the display panel 22 on the basis of the display timing clock to carry out synchronous display control (step S104). Thus, a synchronized image corresponding to the display data is displayed on the display panel 22. Thereafter, when predetermined termination conditions hold, for example, a synchronous display program is terminated or the display data is not updated, the processing is terminated (Yes in step S105).

Description is herein made of a specific synchronous display image and a synchronization form.

Figure 19:
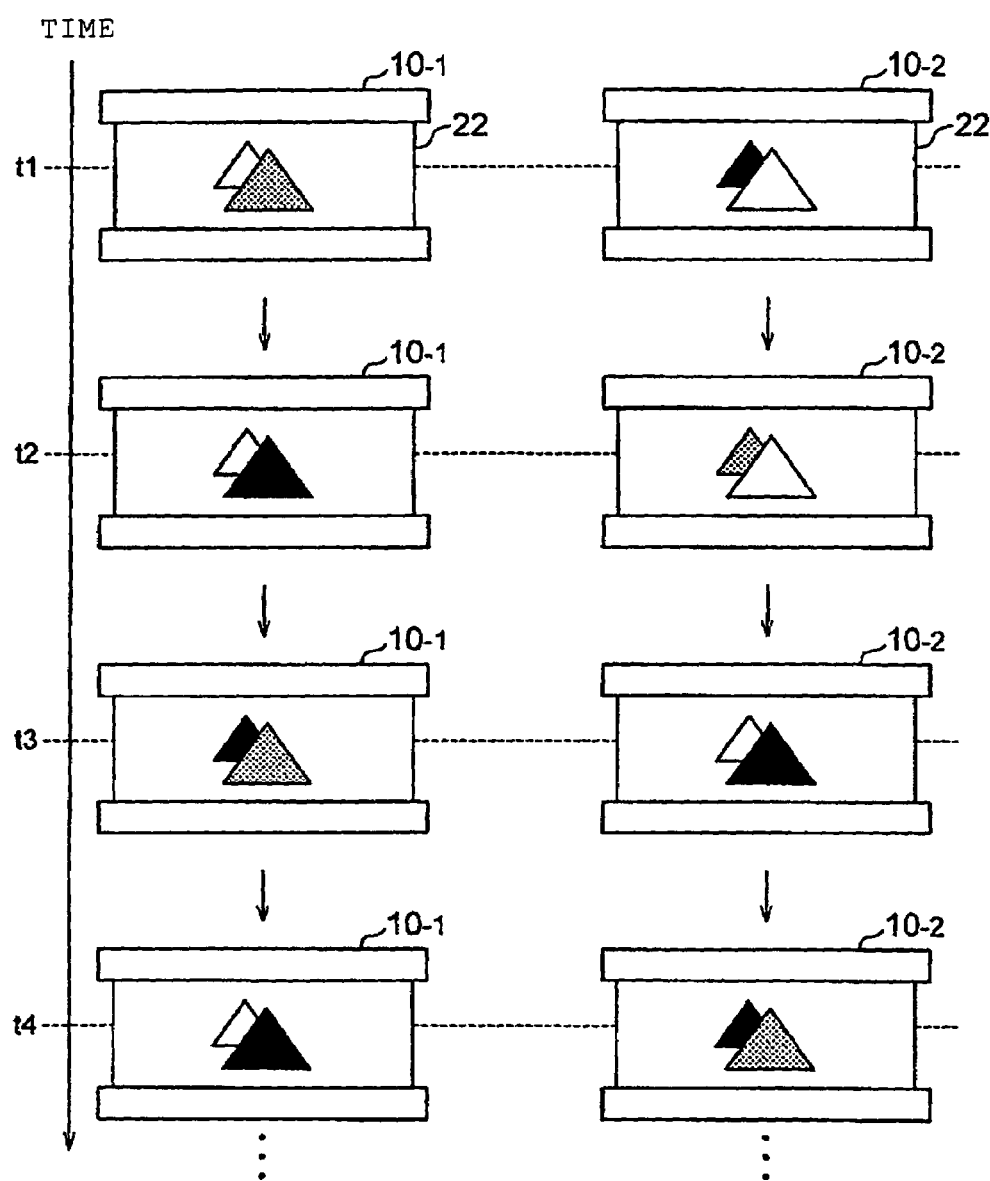
FIG. 19 is an explanatory view in a case where the change in a combination of the colors of a display image is synchronized as the contents of synchronization.

FIG. 19 is an explanatory view in a case where the change in a combination of the colors of display images is synchronized as the contents of synchronization.

At the synchronization timing t1, an image which is a combination of a large triangle in gray and a small triangle in white is displayed on a display panel 22 constituting the display unit 11 in the display device 10-1, and an image which is a combination of a large triangle in white and a small triangle in black is displayed on a display panel 22 constituting the display unit 11 in the display device 10-2.

At the subsequent synchronization timing t2, the display of the image which is the combination of the large triangle in gray and the small triangle in white, which is displayed on the display panel 22 in the display device 10-1, is switched to the display of an image which is a combination of a large triangle in black and a small triangle in white.

In synchronization with the switching of display on the display panel 22 in the display device 10-1, the display of the image which is the combination of the large triangle in white and the small triangle in black, which is displayed on the display panel 22 in the display device 10-1, is switched to the display of an image which is a combination of a large triangle in white and a small triangle in gray.

Similarly at the synchronization timing t3, the display on the display panel 22 in the display device 10-1 is switched to the display of an image which is a combination of a large triangle in gray and a small triangle in black, and the display on the display panel 22 in the display device 10-2 is switched to the display of an image which is a combination of a large triangle in black and a small triangle in white in synchronization therewith. Further, at the synchronization timing t4, the display on the display panel 22 in the display device 10-1 is switched to the display of an image which is a combination of a large triangle in black and a small triangle in white, and the display on the display panel 22 in the display device 10-2 is switched to the display of an image which is a combination of a large triangle in gray and a small triangle in black in synchronization therewith.

Figure 20:
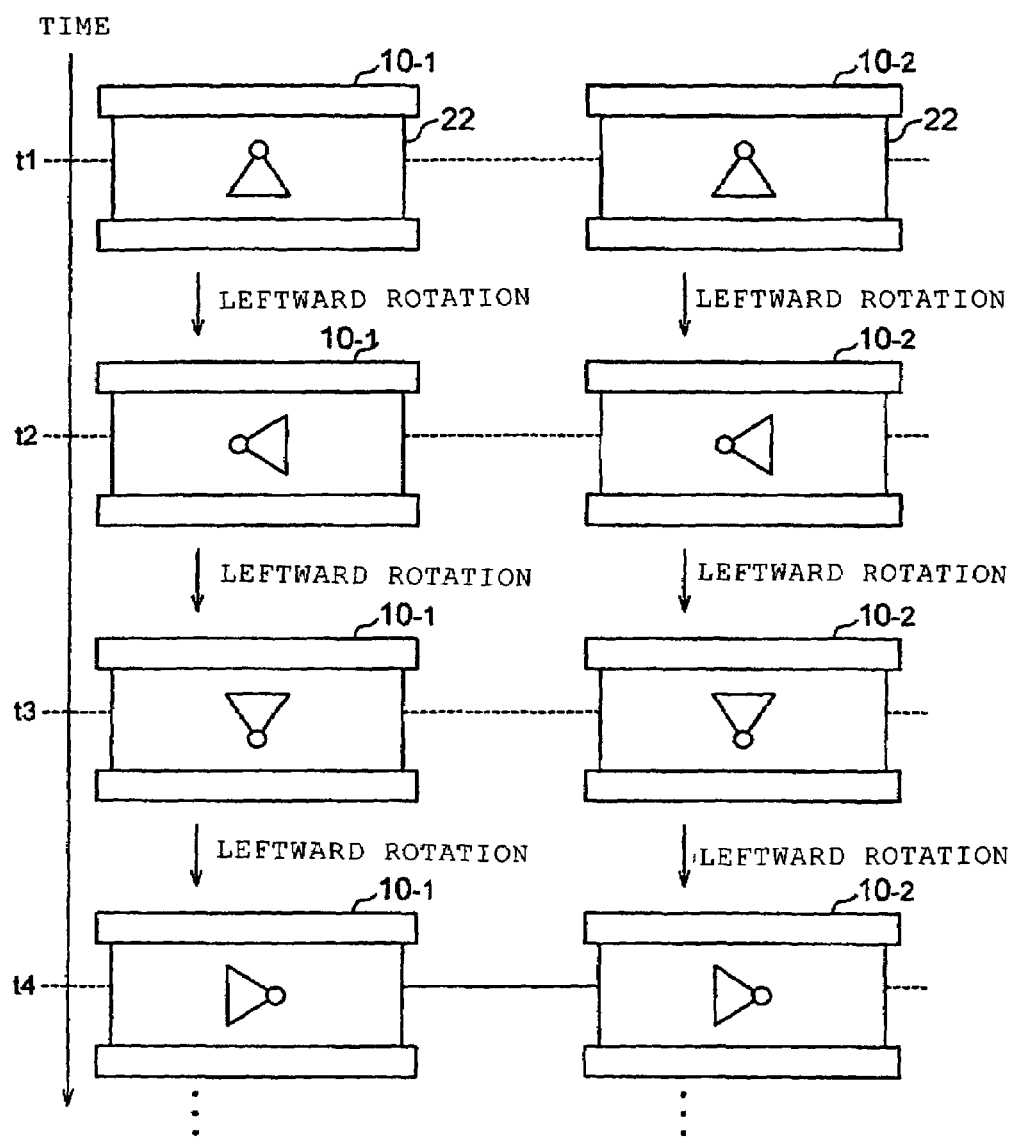
FIG. 20 is an explanatory view in a case where the movements of a display image are synchronized as the contents of synchronization.

FIG. 20 is an explanatory view in a case where the movement of a display image is synchronized as the contents of synchronization.

At the synchronization timing t1, a predetermined image (an image which is a combination of a small circle and a large triangle in FIG. 20) is displayed in a predetermined direction (a direction in which the small circle is arranged on the upper side in FIG. 20) on the display panel 22 constituting the display unit 11 in each of the display devices 10-1 and 10-2.

The predetermined image starts to be rotated leftward by a control program, and is subjected to display control such that the small circle is arranged on the left side at the synchronization timing t2.

Here, in a case where the small circle is not arranged on the left side at the synchronization timing t2, the display control is carried out such that the small circle is forced to be arranged on the left side at the synchronization timing t2.

Similarly, the display image is further rotated leftward by the control program. The display control is carried out such that the small circle is arranged on the lower side at the synchronization timing t3, and is carried out such that the small circle is arranged on the right side at the synchronization timing t4.

Figure 21:
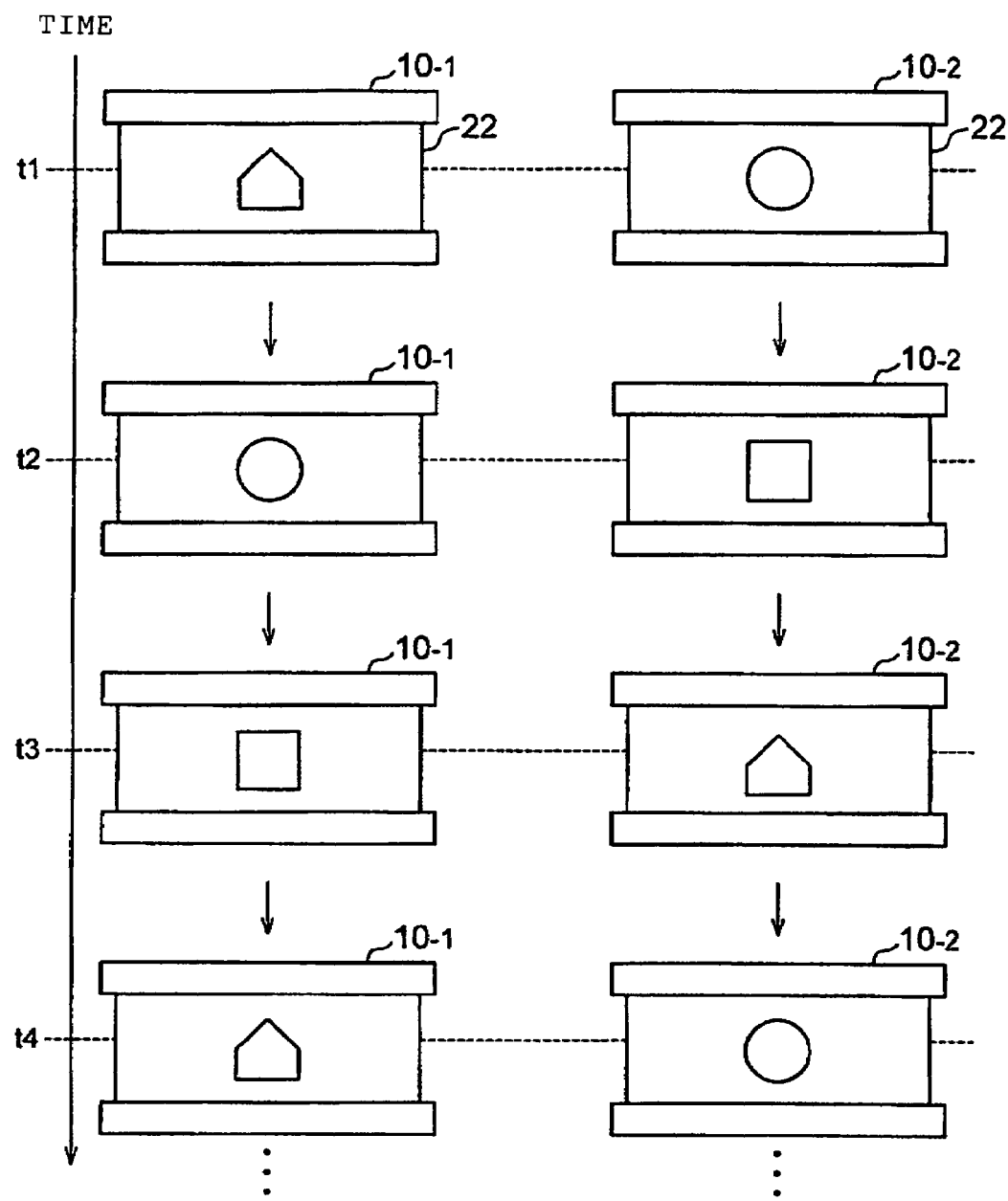
FIG. 21 is an explanatory view in a case where the timings of switching of a display image are synchronized as the contents of synchronization.

FIG. 21 is an explanatory view in a case where the timing of switching of a display image is synchronized as the contents of synchronization.

At the synchronization timing t1, a home base-shaped image is displayed on the display panel 22 constituting the display unit 11 in the display device 10-1, and a round-shaped image is displayed on the display panel 22 constituting the display unit 11 in the display device 10-2.

At the subsequent synchronization timing t2, the display on the display panel 22 in the display device 10-1 is switched to the display of a round-shaped image, and the display on the display panel 22 in the display device 10-2 is switched to the display of a square-shaped image in synchronization with the switching of the display on the display panel 22 in the display device 10-1.

Similarly at the synchronization timing t3, the display on the display panel 22 in the display device 10-1 is switched to the display of a square-shaped image, and the display on the display panel 22 in the display device 10-2 is switched to the display of a home base-shaped image in synchronization with the switching of the display on the display panel 22 in the display device 10-1.

Furthermore, at the synchronization timing t4, the display on the display panel 22 in the display device 10-1 is switched to the display of a home base-shaped image, and the display on the display panel 22 in the display device 10-2 is switched to the display of a round-shaped image in synchronization with the switching of the display on the display panel 22 in the display device 10-1.

In the same manner, the display image is synchronously switched.

As described in the foregoing, according to the present embodiment, images which are synchronized with one another between the plurality of display devices 10 respectively mounted on the plurality of users can be displayed, so that the plurality of users can feel united.

Although in the present embodiment, an example of the synchronous display image was described, the patterns, the colors, and the shapes of the images can be made equal to or different from one another among the plurality of display devices 10 at the same display timing. Specifically, it is considered that identical display images are synchronously displayed, images which are identical in shape change forms are displayed by respectively making only their colors different from one another by the display devices 10.

Although in the present embodiment, description was made of a case where control is carried out in accordance with the procedure for processing of the synchronous display program (control program) previously stored, image display whose display contents are synchronized with movement (for example, an image with dramatic movement is displayed when it heavily moves) can be performed while performing synchronous display depending on the operating state of the user through the sensor 17.

[5] Fifth Embodiment

A fifth embodiment of the present invention will be then described. In the present embodiment, description is made of a configuration in which a plurality of display devices can be synchronized and cooperated with one another, and are integrated to allow an image to be displayed. Particularly in the present embodiment, description is made of a configuration in which a display device 10 is mounted on each of a plurality of users, or a plurality of display devices 10 are mounted on one of the users, and the users can play a game using the display devices 10.

Figure 22:
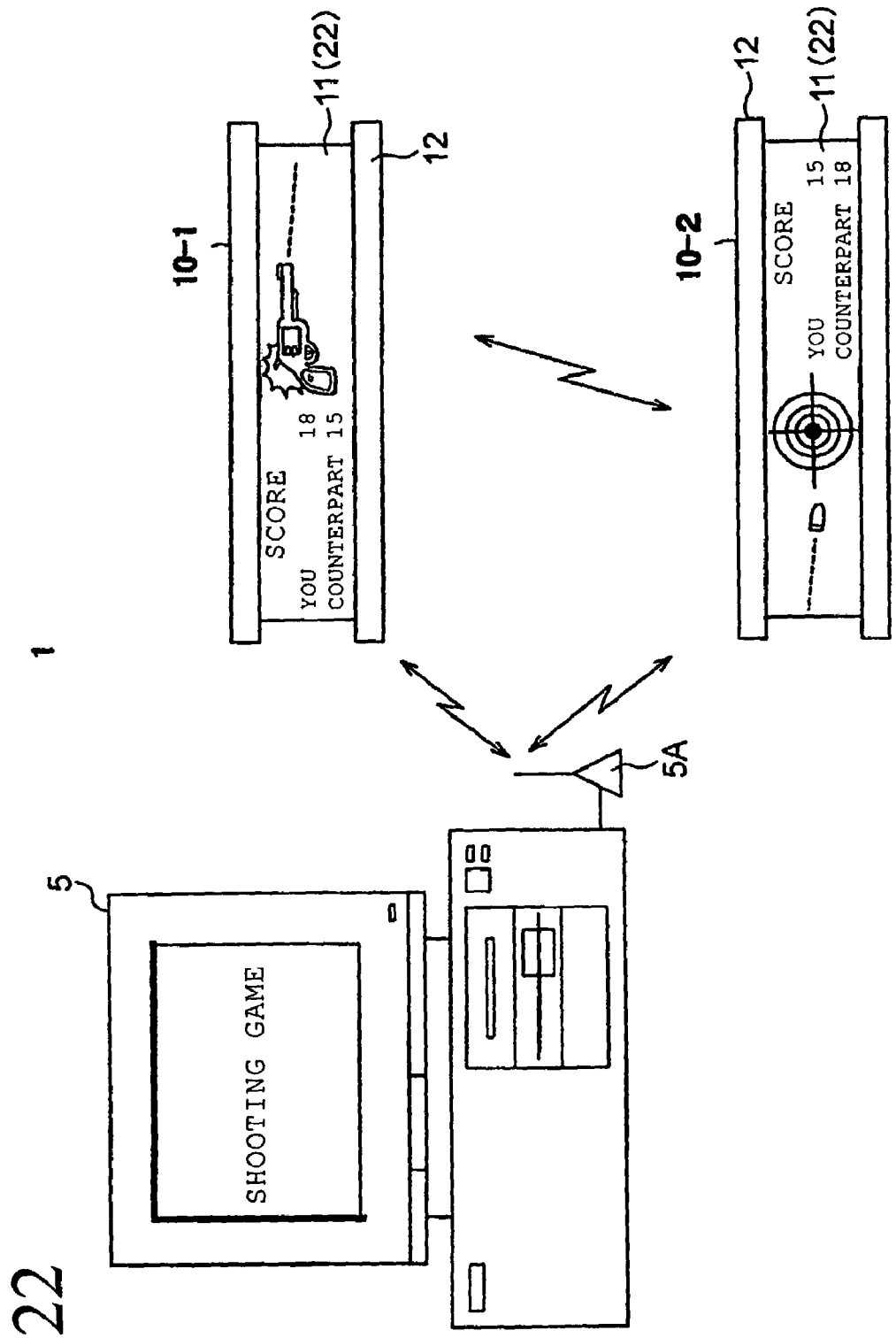
FIG. 22 is a diagram showing the schematic configuration of a fifth embodiment.

FIG. 22 is a diagram schematically showing the configuration of the display device system 1 according to the present embodiment. FIG. 22 illustrates a case where two users play a shooting game. In FIG. 22, the same units as those shown in FIG. 17 are assigned the same reference numerals.

The display device system 1 has a communication unit 5 and display devices 10-1 and 10-2 if it is roughly divided. The communication unit 5 is external equipment corresponding to the display devices 10-1 and 10-2, previously stores a game program for a shooting game and display data, and transmits (transfers) the game program and the display data through a communication antenna 5A. The display devices 10-1 and 10-2 perform image displays which are synchronized with each other on the basis of the game program and the display data from the communication unit 5.

The operations of the display device 10 will be then described by taking a case where two users play the shooting game as an example.

Figure 23:
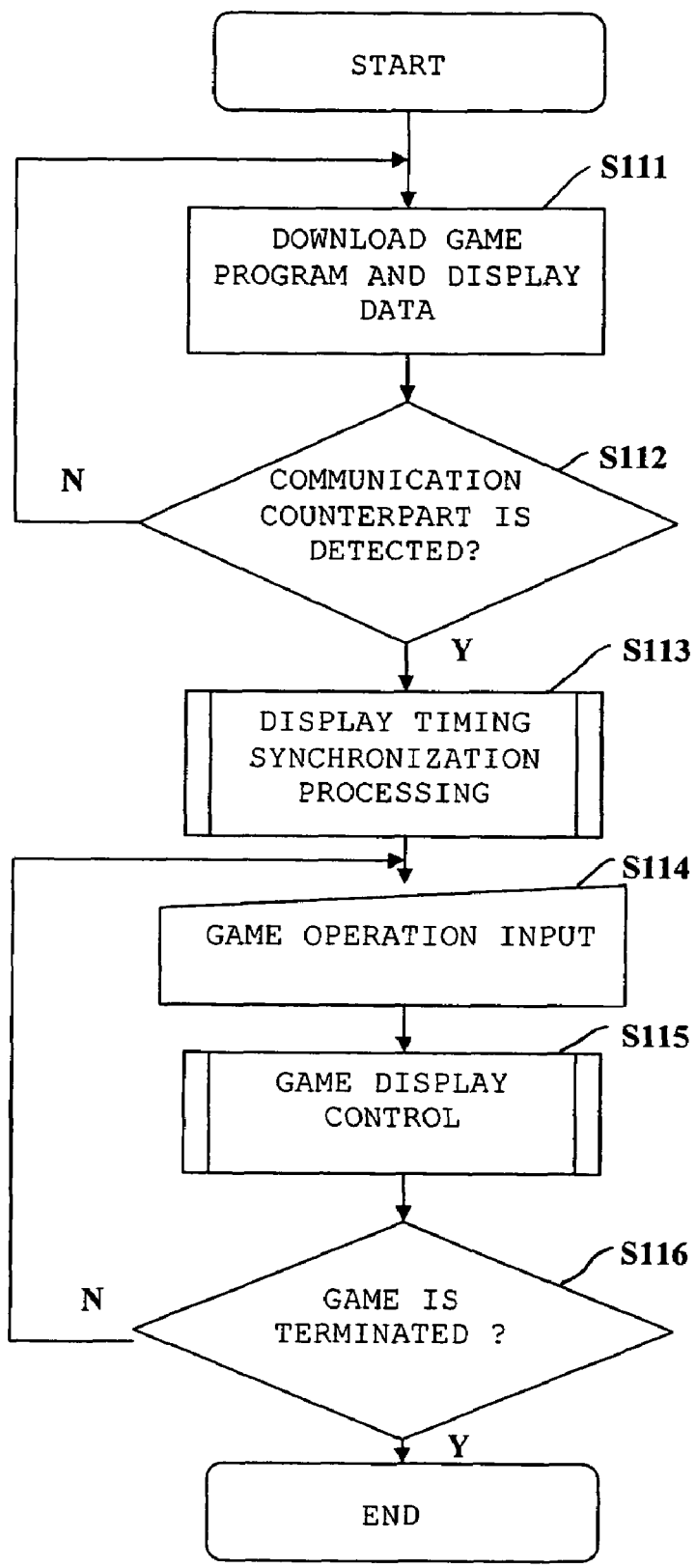
FIG. 23 is a flow chart showing processing in the fifth embodiment.

FIG. 23 is a flow chart showing processing in the present embodiment.

When the game program and the display data are transmitted (transferred) through the communication antenna 5A in the communication unit 5 which is external equipment by an instruction from either one of the two users, respective communication units 18 in the display devices 10-1 and 10-2 perform short-distance radio communication, to download (receive) the game program and the display data (step S111). The game program and the display data are transferred to an external memory 16 under control of a controller 14. In the controller 14 in each of the display devices 10-1 and 10-2, an MPU performs processing on the basis of a game program previously stored in a RAM and a control program stored in a ROM at timing based on a reference oscillation signal generated by an oscillator 15, to transfer display data to a display unit 11 through a connector 24.

The transfer of the control program and the display data from the communication unit 5 (external equipment) to the display devices 10-1 and 10-2 can be performed manually or can be performed automatically. Further, in a case where the transfer is performed automatically, the game program and the display data can be updated when the display device 10 leads to a communication allowable range of the external equipment.

The controller 14 in each of the display devices 10-1 and 10-2 then judges whether or not a communication counterpart is detected (step S112). A case where the communication counterpart is detected means a case where each of the display devices 10-1 and 10-2 exists within a predetermined distance (within a mutual communication allowable range) and a case where identification numbers are respectively previously assigned to the display devices 10-1 and 10-2, and there is a communication request from the display device having the identification number registered as the communication counterpart.

When in the judgment in the step S112, the communication counterpart is not detected (No in step S112), each of the display devices 10-1 and 10-2 enters a stand-by state.

On the other hand, when in the judgment in the step S112, the communication counterpart is detected (Yes in step S112), each of the display devices 10-1 and 10-2 performs display timing synchronization processing such that display timings are synchronized with each other. Specifically, each of the display devices 10-1 and 10-2 generates a display timing clock using communication synchronization timing as a basis in order to synchronize the display timing with the communication synchronization timing. A driver circuit 23 in the display unit 11 in each of the display devices 10-1 and 10-2 drives a display panel 22. Thus, an image corresponding to display data is displayed on the display panel 22.

As a specific display form, on the display panel 22 in the display device 10-1, an image representing a pistol and the respective scores of the display device 10-1 and its counterpart (both are zero in an initial state) are displayed, as shown in FIG. 22. On the other hand, on the display panel 22 in the display device 10-2, an image representing a mark and the respective scores of the display device 10-2 and its counterpart (both are zero in an initial state) are displayed. In a case where display is inverted depending on a state where the display devices 10-1 and 10-2 are mounted, an inversion instruction is inputted to the controller 14 through the sensor 17 by performing a predetermined operation such as an operation for strongly swinging his or her arm three times, so that normal display is performed.

In the controllers 14 in the display devices 10-1 and 10-2, when a user of the display device 10-1 provides predetermined game operation input such as an operation of tapping the display device 10-1 with his or her fingers under such a display state (step S114), such display that the direction of the pistol is suitably selected by the controller 14 through the sensor 17 is performed as control of game display (step S115).

The controller 14 in each of the display devices 10-1 and 10-2 then judges whether or not a predetermined operation for terminating a game (e.g., an operation for strongly swinging the arm five times) is performed (step S116).

When in the judgment in the step S116, the predetermined operation for terminating a game is not performed (No in step S116), the user then performs a predetermined operation such as an operation for strongly swinging his or her arm once so that an instruction to fire a pistol is inputted to the controller 14 through the sensor 17 in the display device 10-1, and a track in which a bullet flies out of the pistol is displayed on the display panel 22 in the display device 10-1.

Correspondingly, the communication unit 18 in the display device 10-1 notifies the controller 14 in the display device 10-2 of the direction in which and the timing at which the bullet flies out, for example, through the communication unit 18 in the display device 10-2.

On the other hand, the controller 14 in the display device 10-2 causes the display panel 22 in the display device 10-2 to display an image representing the bullet flying toward the mark in a predetermined direction.

The controller 14 in the display device 10-2 displays, when the bullet hits the mark, an image representing the bullet which has hit the mark on the display panel 22 as a result of an arithmetic operation, and counts scores corresponding to spots which the bullet hits to display the counted scores at a predetermined position of the display panel 22 (step S115).

The processing proceeds to the step S116 again, to perform the same processing.

As described in the foregoing, according to the present embodiment, images which are synchronized with one another among the plurality of display devices respectively mounted on the plurality of users can be displayed, so that the plurality of users can feel united.

According to the present embodiment, the plurality of users can communicate with one another through the game using the display devices 10. Furthermore, according to the display devices 10, entertainment properties can be improved utilizing various application programs such as a game program.

Although in the present embodiment, description was made of a case where the controller 14 is notified of the direction in which and the timing at which the bullet flies, for example, as data, the direction in which the bullet flies, for example, can be also determined on the basis of the direction in which a communication medium (a radio wave, light, etc.) arrives using narrow directivity communication means.

According to the above-mentioned third to fifth embodiments, the plurality of display devices 10 are respectively display images in synchronization and cooperation with each other, thereby allowing an image (including a moving image) having contents which cannot be completely expressed by one display device to be displayed.

Here, although in the above-mentioned third to fifth embodiments, a case where display devices are connected to one another by a daisy chain as a form of a communication network (communication), the display devices may be constructed as a communication network of a peer-to-peer type, a star type, a ring type, or a bus type as a communication network for display data.

Although in the above-mentioned third to fifth embodiments, description was made of a case where one display device is mounted on the plurality of users, a plurality of display devices can be mounted on one user, or a plurality of display devices can be respectively mounted on a plurality of users.

In the above-mentioned third to fifth embodiments, the plurality of display devices 10 can be used as a communication tool by transmitting and receiving a message or the like to and from one another through external equipment.

Although in the above-mentioned first to fifth embodiments, description was made of a case where the number of display units is one or two, more display units can be also provided. Also in this case, displays can be synchronized among the plurality of display units.

Although in the above-mentioned first to fifth embodiments, description was made of a case where the control program for controlling the display device is previously stored in the ROM, the control program may be previously stored in recording media such as various types of magnetic disks, optical disks, and memory cards, read from the recording media, and installed. Furthermore, the communication unit can be also connected to a network such as the Internet or a LAN (Local Area Network) to download, install, and execute the control program through the network. By such a configuration, highly functional display control in a software manner can be carried out.

Terms used to designate directions such as "front", "rear", "up", "down", "vertical", "horizontal", "oblique", and others used in the foregoing mean directions on the used drawings. Consequently, the terms used to designate the directions used for explaining the present invention are more relatively interpreted, as compared with those in the used drawings.

Terms used to designate degrees such as "almost", "approximately", "roughly", etc. used in the foregoing mean such a suitable amount of deviation that a great change is not consequently brought about. The terms used to designate the degrees should be interpreted as ones including an error of at least approximately ±5% unless a serious change is brought about by deviation.

It is clearly understood that the foregoing embodiments are a part of the present invention, and those skilled in the art can subject the embodiments to various modifications without departing from the scope of the present invention defined in the claims. Further, the foregoing embodiments only describe the present invention and do not limit the scope thereof defied by the scope of the claims, described later, and its equivalent range.

[Description of Reference Numerals]

In the drawings, 5 denotes a communication unit, 10 denotes a display device, 11 denotes a display unit, 12 denotes a frame, 13 denotes a power supply, 14 denotes a controller, 15 denotes an oscillator, 16 denotes an external memory, 17 denotes a sensor, 18 denotes a communication unit, 24 denotes a connector, 30 denotes a cover, 31 denotes an electronic component, 32 denotes a flexible substrate, 33 denotes a power supply connector, 51 denotes a first display unit, 52 denotes a second display unit, 53 denotes a frame, 53A denotes a first frame, 53B denotes a second frame, 53C denotes a hinge, 54A and 54B denote power supplies, 53B denotes a connector, 100 denotes an inner periphery, 101 denotes a fold, 102 denotes an outer periphery, 103 denotes a groove, 104 denotes a receiver, 105 denotes a transmitter, 106 denotes an outer peripheral surface, and 107 denotes an inner peripheral surface.

The invention claimed is:

1. A display device comprising:
   a first frame having a first outer peripheral surface and a first side peripheral surface, said first frame having a ring shape being configured to be mounted on a user;

a first display unit being arranged along said first outer peripheral surface over substantially an entire circumference of said first frame to display information; and a first sensor being arranged on said first side peripheral surface to perform radio communication, said first sensor having a motion sensor, and said first display unit having a display change device to change a display via a signal from said motion sensor.

2. The display device according to claim 1, further comprising, a second frame that has a second outer peripheral surface and a second side peripheral surface, said second frame having a ring shape and being configured to be mounted on said user, a second display unit arranged along said second outer peripheral surface over substantially an entire circumference of said second frame, and a second sensor arranged on said second side peripheral surface to perform radio communication with said first sensor.

3. The display device according to claim 2, wherein said first display unit has a first inner periphery arranged on a peripheral surface of said first frame, a first fold that integrally connects with one end of said first inner periphery, and a first outer periphery arranged on said first inner periphery over substantially an entire circumference thereof and integrally connecting with said first fold, and said second display unit has a second inner periphery arranged on a peripheral surface of said second frame, a second fold that integrally connects with one end of said second inner periphery, and a second outer periphery arranged on said second inner periphery over substantially an entire circumference thereof and integrally connecting with said second fold.

4. The display device comprising:

a first frame having a first outer peripheral surface and a first side peripheral surface, said first frame having a ring shape being configured to be mounted on a user;

a first display unit being arranged along said first outer peripheral surface over substantially an entire circumference of said first frame to display information;

a first sensor being arranged on said first side peripheral surface to perform radio communication;

a second frame that has a second outer peripheral surface and a second side peripheral surface, said second frame having a ring shape and being configured to be mounted on said user, a second display unit arranged along said second outer peripheral surface over substantially an entire circumference of said second frame, and a second sensor arranged on said second side peripheral surface to perform radio communication with said first sensor, said first frame including a first groove extending in a circumferential direction on an outer peripheral surface thereof, said first display unit being arranged within said first groove, and said second frame including a second groove extending in a circumferential direction on an outer peripheral surface thereof, said second display unit being arranged within the second groove.

5. The display device according to claim 2, wherein said first outer periphery has a first display panel, said first inner periphery has a first flexible base formed of a flexible member and a first electronic component arranged on said first flexible base, said second outer periphery has a second display panel, and said second inner periphery has a second flexible base formed of a flexible member and a second electronic component arranged on said second flexible base.

6. The display device comprising:

a first frame having a first outer peripheral surface and a first side peripheral surface, said first frame having a ring shape being configured to be mounted on a user;

a first display unit being arranged along said first outer peripheral surface over substantially an entire circumference of said first frame to display information;

a first sensor being arranged on said first side peripheral surface to perform radio communication;

a second frame that has a second outer peripheral surface and a second side peripheral surface, said second frame having a ring shape and being configured to be mounted on said user;

a second display unit arranged along said second outer peripheral surface over substantially an entire circumference of said second frame, and a second sensor arranged on said second side peripheral surface to perform radio communication with said first sensor, said first sensor having at least one first LED, a plurality of first photodiodes, and a rotational position detector to detect a rotational position of said first frame via signals from said first photodiodes, and said second sensor having at least one second LED, a plurality of second photodiodes, and a rotational position detector to detect a rotational position of said second frame via signals from said second photodiodes.

7. The display device according to claim 2, wherein said first sensor has a relative rotational position detector to detect a rotational position of said first frame relative to said second frame, and said first display unit has a first display image control to control a display image via information relating to said relative rotational position detected by said first sensor.

8. The display device according to claim 7, wherein said second sensor includes a relative rotational position detector to detect said rotational position of said second frame relative to said first frame, and said second display unit includes a second display image control to control a display image via information relating to said relative rotational position detected by the second sensor.

* * * * *